(12) United States Patent
Wang et al.

(10) Patent No.: US 11,194,331 B2
(45) Date of Patent: Dec. 7, 2021

(54) UNSUPERVISED CLASSIFICATION OF ENCOUNTERING SCENARIOS USING CONNECTED VEHICLE DATASETS

(71) Applicant: THE REGENTS OF THE UNIVERSITY OF MICHIGAN, Ann Arbor, MI (US)

(72) Inventors: Wenshuo Wang, Ann Arbor, MI (US); Aditya Ramesh, Ann Arbor, MI (US); Ding Zhao, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 313 days.

(21) Appl. No.: 16/175,076

(22) Filed: Oct. 30, 2018

(65) Prior Publication Data

US 2020/0133269 A1    Apr. 30, 2020

(51) Int. Cl.
| | |
|---|---|
| *G05D 1/00* | (2006.01) |
| *G06K 9/62* | (2006.01) |
| *G06K 9/46* | (2006.01) |
| *G06N 3/08* | (2006.01) |

(Continued)

(52) U.S. Cl.
CPC ......... *G05D 1/0088* (2013.01); *G05D 1/0221* (2013.01); *G05D 1/0289* (2013.01); *G06K 9/42* (2013.01); *G06K 9/46* (2013.01); *G06K 9/6218* (2013.01); *G06K 9/6223* (2013.01); *G06K 9/6267* (2013.01); *G06N 3/088* (2013.01); *G05D 2201/0213* (2013.01)

(58) Field of Classification Search
CPC .. G05D 1/0088; G05D 1/0289; G05D 1/0221; G05D 2201/0213; G06K 9/6218; G06K 9/6223; G06K 9/42; G06K 9/46; G06K 9/6267; G06N 3/088
See application file for complete search history.

(56) References Cited

U.S. PATENT DOCUMENTS

| | | | |
|---|---|---|---|
| 9,120,484 B1 | 9/2015 | Ferguson et al. | |
| 9,248,834 B1* | 2/2016 | Ferguson ............. | G05D 1/0088 |
| 9,403,482 B2 | 8/2016 | Shahraray et al. | |

(Continued)

OTHER PUBLICATIONS

T. Appenzeller, "The scientists' apprentice," Science, vol. 357, No. 6346, pp. 16-17, 2017.

(Continued)

*Primary Examiner* — Dale W Hilgendorf
(74) *Attorney, Agent, or Firm* — Quarles & Brady LLP

(57) ABSTRACT

The present disclosure provides a method in a data processing system that includes at least one processor and at least one memory. The at least one memory includes instructions executed by the at least one processor to implement a driving encounter recognition system. The method includes receiving information, from one or more sensors coupled to a first vehicle, determining first trajectory information associated with the first vehicle and second trajectory information associated with a second vehicle, extracting a feature vector, providing the feature vector to a trained classifier, the classifier trained using unsupervised learning based on a plurality of feature vectors, and receiving, from the trained classifier, a classification of the current driving encounter in order to facilitate the first vehicle to perform a maneuver based on the current driving encounter.

19 Claims, 14 Drawing Sheets

(51) Int. Cl.
G06K 9/42 (2006.01)
G05D 1/02 (2020.01)

(56) References Cited

U.S. PATENT DOCUMENTS

| | | | |
|---|---|---|---|
| 9,914,452 B1* | 3/2018 | Ferguson | B60W 30/0956 |
| 10,012,993 B1 | 7/2018 | Matus et al. | |
| 10,095,774 B1* | 10/2018 | Soceanu et al. | G06K 9/6218 |
| 10,185,327 B1* | 1/2019 | Konrardy | G01C 21/3453 |
| 10,558,224 B1* | 2/2020 | Lin et al. | G05D 1/0088 |
| 2006/0184461 A1* | 8/2006 | Mori | G06N 3/088 |
| | | | 706/13 |
| 2006/0248026 A1* | 11/2006 | Aoyama | G05D 1/0221 |
| | | | 706/12 |
| 2009/0210446 A1* | 8/2009 | Gelbard et al. | G06K 9/6218 |
| | | | 707/999.103 |
| 2010/0063735 A1* | 3/2010 | Kindo | B60W 40/072 |
| | | | 701/300 |
| 2012/0083960 A1* | 4/2012 | Zhu et al. | G05D 1/0214 |
| | | | 701/23 |
| 2014/0063232 A1* | 3/2014 | Fairfield et al. | G05D 1/008 |
| | | | 348/118 |
| 2014/0142799 A1* | 5/2014 | Ferguson et al. | G05D 1/0088 |
| | | | 701/23 |
| 2016/0180713 A1* | 6/2016 | Bernhardt et al. | G05D 1/0289 |
| | | | 701/70 |
| 2017/0285639 A1* | 10/2017 | Jones et al. | G05D 1/0221 |
| 2017/0286781 A1* | 10/2017 | Xu | G06T 7/20 |
| 2017/0293837 A1 | 10/2017 | Cosatto et al. | |
| 2018/0150081 A1* | 5/2018 | Gross et al. | G05D 1/0221 |
| 2018/0164825 A1 | 6/2018 | Matus et al. | |
| 2018/0173240 A1* | 6/2018 | Fang | B60W 50/0097 |
| 2018/0217600 A1* | 8/2018 | Shashua et al. | G05D 1/0088 |
| 2018/0284735 A1* | 10/2018 | Cella | G05B 23/0221 |
| 2018/0333063 A1* | 11/2018 | Muchhala et al. | G06N 3/088 |
| 2019/0018415 A1* | 1/2019 | Netter | B60W 50/0097 |
| 2019/0025841 A1* | 1/2019 | Haynes et al. | G05D 1/0221 |
| 2019/0188319 A1* | 6/2019 | Anerousis | G06F 16/35 |
| 2019/0276016 A1* | 9/2019 | Giorelli et al. | |
| | | | G05D 2201/0213 |
| 2019/0295419 A1* | 9/2019 | Tosa et al. | G05D 2201/0213 |
| 2020/0019815 A1* | 1/2020 | Balu | G06K 9/6223 |
| 2020/0055515 A1* | 2/2020 | Herman et al. | G05D 1/0088 |

OTHER PUBLICATIONS

B. Aronov, S. Har-Peled, C. Knauer, Y. Wang, and C. Wenk, "Fréchet distance for curves, revisited," in European Symposium on Algorithms. Springer, 2006, pp. 52-63.
P. C. Besse, B. Guillouet, J.-M. Loubes, and F. Royer, "Review and perspective for distance-based clustering of vehicle trajectories," IEEE Transactions on Intelligent Transportation Systems, vol. 17, No. 11, pp. 3306-3317, 2016.
P. C. Besse, B. Guillouet, J.-M. Loubes, and F. Royer, "Destination prediction by trajectory distribution-based model," IEEE Transactions on Intelligent Transportation Systems, 2017.
J. Bian, D. Tian, Y. Tang, and D. Tao, "A survey on trajectory clustering analysis," arXiv preprint arXiv:1802.06971, 2018.
Z.-J. Chen, C.-Z. Wu, Y.-S. Zhang, Z. Huang, J.-F. Jiang, N.-C. Lyu, and B. Ran, "Vehicle behavior learning via sparse reconstruction with l2-lp minimization and trajectory similarity," IEEE Transactions on Intelligent Transportation Systems, vol. 18, No. 2, pp. 236-247, 2017.
M. Y. Choong, L. Angeline, R. K. Y. Chin, K. B. Yeo, and K. T. K. Teo, "Modeling of vehicle trajectory clustering based on less for traffic pattern extraction," in Automatic Control and Intelligent Systems (I2CACIS), 2017 IEEE 2nd International Conference on. IEEE, 2017, pp. 74-79.
N. Deo, A. Rangesh, and M. M. Trivedi, "How would surround vehicles move? A unified framework for maneuver classification and motion prediction," arXiv preprint arXiv:1801.06523, 2018.
Z. Feng and Y. Zhu, "A survey on trajectory data mining: Techniques and applications," IEEE Access, vol. 4, pp. 2056-2067, 2016.
E. Galceran, A. G. Cunningham, R. M. Eustice, and E. Olson, "Multipolicy decision-making for autonomous driving via changepoint-based behavior prediction: Theory and experiment," Autonomous Robots, vol. 41, No. 6, pp. 1367-1382, 2017.
S. Hochreiter and J. Schmidhuber, "Long short-term memory," Neural computation, vol. 9, No. 8, pp. 1735-1780, 1997.
T. Kanungo, D. M. Mount, N. S. Netanyahu, C. D. Piatko, R. Silverman, and A. Y. Wu, "An efficient k-means clustering algorithm: Analysis and implementation," IEEE transactions on pattern analysis and machine intelligence, vol. 24, No. 7, pp. 881-892, 2002.
J. Kim and H. S. Mahmassani, "Spatial and temporal characterization of travel patterns in a traffic network using vehicle trajectories," Transportation Research Part C: Emerging Technologies, vol. 59, pp. 375-390, 2015.
B. M. Lake, R. Salakhutdinov, and J. B. Tenenbaum, "Human-level concept learning through probabilistic program induction," Science, vol. 350, No. 6266, pp. 1332-1338, 2015.
S. Li, W. Wang, Z. Mo, and D. Zhao, "Clustering of naturalistic driving encounters using unsupervised learning," arXiv preprint arXiv:1802.10214, 2018.
T. W. Liao, "Clustering of time series data: A survey," Pattern recognition, vol. 38, No. 11, pp. 1857-1874, 2005.
M. Müller, "Dynamic time warping," Information retrieval for music and motion, pp. 69-84, 2007.
M. C. Nechyba and Y. Xu, "Stochastic similarity for validating human control strategy models," IEEE Transactions on Robotics and Automation, vol. 14, No. 3, pp. 437-451, 1998.
C. Piciarelli, C. Micheloni, and G. L. Foresti, "Trajectory-based anomalous event detection," IEEE Transactions on Circuits and Systems for video Technology, vol. 18, No. 11, pp. 1544-1554, 2008.
F. T. Pokorny, K. Goldberg, and D. Kragic, "Topological trajectory clustering with relative persistent homology," in Robotics and Automation (ICRA), 2016 IEEE International Conference on. IEEE, 2016, pp. 16-23.
Z. Sun, P. Hao, X. J. Ban, and D. Yang, "Trajectory-based vehicle energy/emissions estimation for signalized arterials using mobile sensing data," Transportation Research Part D: Transport and Environment, vol. 34, pp. 27-40, 2015.
A. A. Taha and A. Hanbury, "An efficient algorithm for calculating the exact hausdorff distance," IEEE transactions on pattern analysis and machine intelligence, vol. 37, No. 11, pp. 2153-2163, 2015.
J. Taylor, X. Zhou, N. M. Rouphail, and R. J. Porter, "Method for investigating intradriver heterogeneity using vehicle trajectory data: A dynamic time warping approach," Transportation Research Part B: Methodological, vol. 73, pp. 59-80, 2015.
J. Wang, C. Wang, X. Song, and V. Raghavan, "Automatic intersection and traffic rule detection by mining motor-vehicle gps trajectories," Computers, Environment and Urban Systems, vol. 64, pp. 19-29, 2017.
W. Wang, C. Liu, and D. Zhao, "How much data are enough? a statistical approach with case study on longitudinal driving behavior," IEEE Transactions on Intelligent Vehicles, vol. 2, No. 2, pp. 85-98, 2017.
R. Xu and D. Wunsch, "Survey of clustering algorithms," IEEE Transactions on neural networks, vol. 16, No. 3, pp. 645-678, 2005.
D. Yao, C. Zhang, Z. Zhu, J. Huang, and J. Bi, "Trajectory clustering via deep representation learning," in Neural Networks (IJCNN), 2017 International Joint Conference on. IEEE, 2017, pp. 3880-3887.
D. Yao, C. Zhang, Z. Zhu, Q. Hu, Z. Wang, J. Huang, and J. Bi, "Learning deep representation for trajectory clustering," Expert Systems, 2018, DOI: 10.1111/exsy.12252.
W. Yao, Q. Zeng, Y. Lin, D. Xu, H. Zhao, F. Guillemard, S. Geronimi, and F. Aioun, "On-road vehicle trajectory collection and scene-based lane change analysis: Part II," IEEE Transactions on Intelligent Transportation Systems, vol. 18, No. 1, pp. 206-220, 2017.

(56) References Cited

OTHER PUBLICATIONS

G. Yuan, P. Sun, J. Zhao, D. Li, and C. Wang, "A review of moving object trajectory clustering algorithms," Artificial Intelligence Review, vol. 47, No. 1, pp. 123-144, 2017.

X. Zhan, Y. Zheng, X. Yi, and S. V. Ukkusuri, "Citywide traffic volume estimation using trajectory data," IEEE Transactions on Knowledge and Data Engineering, vol. 29, No. 2, pp. 272-285, 2017.

H. Zhao, C. Wang, Y. Lin, F. Guillemard, S. Geronimi, and F. Aioun, "On-road vehicle trajectory collection and scene-based lane change analysis: Part I," IEEE Transactions on Intelligent Transportation Systems, vol. 18, No. 1, pp. 192-205, 2017.

P. Zhao, K. Qin, X. Ye, Y. Wang, and Y. Chen, "A trajectory clustering approach based on decision graph and data field for detecting hotspots," International Journal of Geographical Information Science, vol. 31, No. 6, pp. 1101-1127, 2017.

\* cited by examiner

FIG. 7A
FIG. 7B
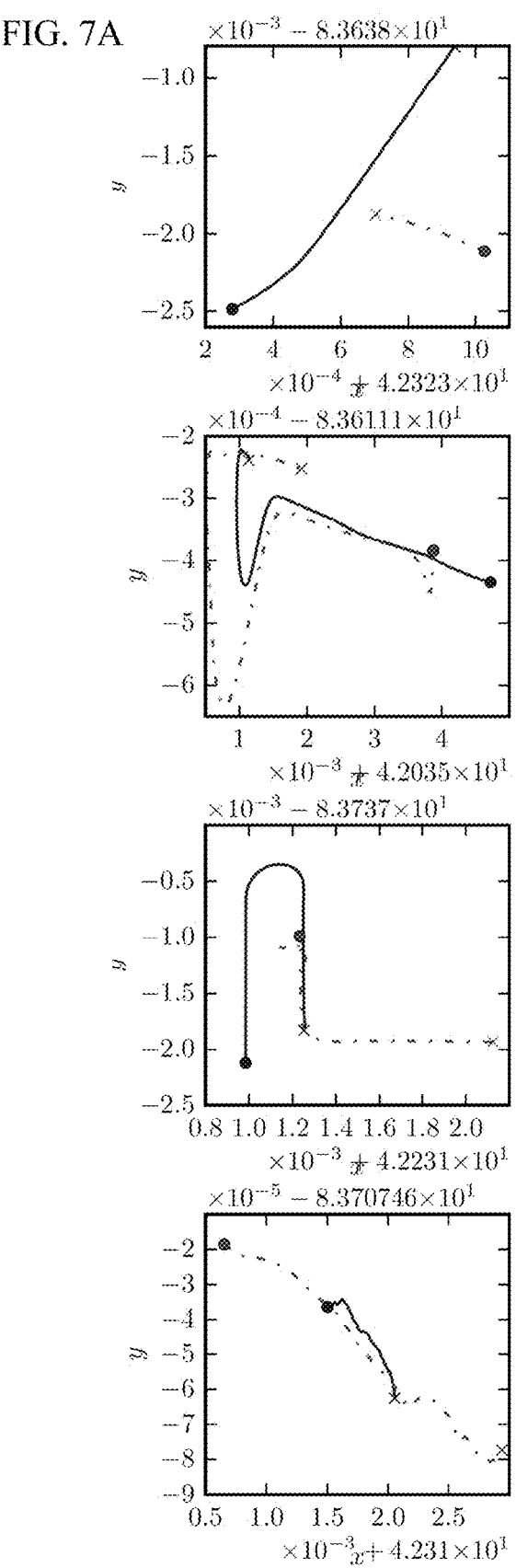
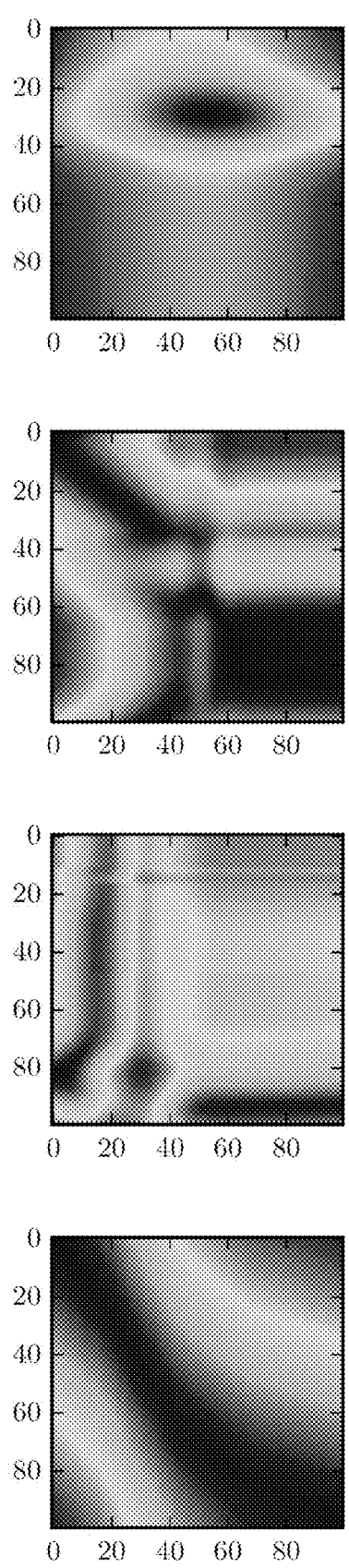

UNSUPERVISED CLASSIFICATION OF ENCOUNTERING SCENARIOS USING CONNECTED VEHICLE DATASETS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to a method for classifying driving encounters between two vehicles.

2. Description of the Related Art

A driving encounter in this disclosure can be a scenario where two or multiple vehicles are spatially close to and interact with each other when driving. For autonomous vehicle and/or human-driven vehicle, both are faced with various interactive scenarios in real traffic and should make proper decisions. A well-designed decision-making and control system for self-driving vehicles should fully understand and efficiently tackle with any kinds of driving encounters to guarantee road safety and traffic efficiency.

Many kinds of advanced communication techniques such as dedicated short range communications (DSRC) have been developed to gather driving encounter data for model and analysis. Interactions between multiple vehicles can be interpreted by their trajectory—a set of positional information for moving vehicles, ordered by time. The growing use of global positioning system (GPS) receivers in equipped vehicles enables to collect large amounts of high-quality trajectory data at a low cost. Applying positional trajectories to dig underlying information is prevalent in many fields, for example, driver behavior pattern analysis and prediction (Ref. 1, 2), travel destination prediction (Ref. 3), anomalous driving behavior detection (Ref. 4), eco-driving (Ref. 5), vehicle behavior reconstruction (Ref. 6), etc. However, the diversity of driving encounters at variance with human drivers and driving conditions (e.g., road, traffic, and other road users) and the flood of high-dimensional traffic data can overwhelm human insight and analysis (Ref. 7), thus limiting their applications. FIG. 1 presents some typical driving encounters in real traffic. In FIG. 1, six driving encounters 1(a)-1(f) are shown with a first trajectory 10a of a first vehicle and a second trajectory 10b of a second vehicle. Towards this end, clustering driving encounters into groups to distinguish from each other enables a straightforward approach to exploiting the underlying information, encourages a rich design space and functionality for synthetic traffic systems, and highlights a compelling need for the integrative analysis of between human drivers or between human drivers and autonomous vehicles.

For vehicle trajectory analysis and associated applications, many clustering algorithms and data mining techniques have been investigated, as reviewed in (Ref. 8, 9). Besse et al. (Ref. 10) proposed a distance-based algorithm to learn representations of each single vehicle trajectory and then applied a hierarchical clustering (HC) to the representations of all vehicles for categorization. Moreover, the authors in (Ref. 3) also developed a two-step procedure to predict trip destination using a density-based clustering of destination and start initial part of trajectories. Yao et al. (Ref. 11) used a sliding window to extract a set of moving behavior features that capture space and time-invariant characteristics of the trajectories. Zhao et al. (Ref. 12, 13) extracted lane change behavior according to vehicle's raw movement trajectory and addressed the scene based analysis. In order to attain traffic patterns for traffic surveillance, Choong et al. (Ref. 14) implemented the longest common subsequence (LCSS) to measure similarity levels of trajectories as features and then clustered vehicle trajectories into groups using k-means and fuzzy c-means. Some research (Ref. 9, 15-18) also applied clustering algorithms to detect 2 traffic information such as traffic hotspots, traffic patterns and traffic volume based on vehicle GPS trajectories. Pokorny et al. (Ref. 19) proposed a topological trajectory clustering by considering the relative persistent homology between motion trajectories and the experiment results demonstrate that the topological trajectory clustering method is faster and more efficient than a metric clustering by Fréchet distance. A common autoencoder has been used to extract features of characterizing driving encounters (Ref. 20).

For most of aforementioned research, they mainly aim at discovering the group of similar individual trajectories, rather than the group of similar pairs of trajectories—driving encounters. Investigating the patterns of driving encounters could be beneficial to gain insight into how human drivers make decisions when encountering with others, thereby providing external knowledge for self-driving applications and driver assistance system design. For example, the classification of driver's typical behaviors at unsignalized intersections and on highways offers researchers detailed information to design decision-making systems (Ref. 21) for autonomous vehicles with ability to harmoniously interact with surrounding road users. Towards this goal, many researchers have conducted research based on vehicle-to-vehicle (V2V) trajectories in empirically predefined specific and typical scenarios such as changing lanes. Although they have made remarkable achievement, the specific scenarios they focused on could not fully represent all driving encounters, which strongly limits their further applications. There exist many off-the-shelf algorithms to deal with a group of single trajectories, but no one efficient approach to cluster a group of pairs of vehicle trajectories.

Therefore, an improved method for training autonomous vehicles using clustered pairs of vehicle trajectories is desired.

SUMMARY OF THE INVENTION

The present invention provides a method to efficiently cluster vehicle trajectories in order to train autonomous vehicles. The method can include training an autoencoder using a plurality of vehicle trajectories in an unsupervised learning process, classifying a plurality of feature vectors extracted from the autoencoder using unsupervised learning such as clustering, and providing the classifications to an autonomous vehicle. Categorizing driving encounters into groups provides insights into each kind of driving encounter scenario and offer opportunities to test distance-based and/or clustering algorithms.

In one aspect, the present disclosure provides a method in a data processing system that includes at least one processor and at least one memory. The at least one memory includes instructions executed by the at least one processor to implement a driving encounter recognition system. The method includes receiving information from one or more sensors coupled to a first vehicle, determining, based on the information received from the one or more sensors coupled to the first vehicle, first trajectory information associated with the first vehicle and second trajectory information associated with a second vehicle, extracting, based on a current driving encounter comprising the first trajectory information and the second trajectory information, a feature vector, providing the feature vector to a trained classifier, the classifier trained using unsupervised learning based on a plurality of feature vectors corresponding to driving encounters, and receiving, from the trained classifier, a classification of the current driving encounter in order to facilitate the first vehicle to perform a maneuver based on the current driving encounter.

The method may include sensing that the first vehicle and the second vehicle are within a predetermined distance of each other. The method may include receiving information from the one or more sensors for a predetermined time. The predetermined time can be about 5 to about 20 seconds.

In the method, the classifier can be trained using a clustering technique. The classifier can be trained using k-means clustering. The clustering technique can be a number of clusters selected in order maximize between-cluster distance and minimize within-cluster distance. The method can include normalizing the first trajectory information and the second trajectory information to a predetermined number of data points. The predetermined number of data points can be about 50 to about 400 data points.

The feature vector can be extracted using an autoencoder, and the plurality of feature vectors can be extracted using the autoencoder. The autoencoder can be a long-short term memory autoencoder, a normalized Euclidean distance long-short term memory autoencoder, or a dynamic time warping convolutional autoencoder. The feature vector can be extracted using a distance-based formula, and the plurality of feature vectors can be extracted using the distance-based formula. The distance-based formula can use dynamic time warping or normalized Euclidean distance.

In another aspect, the present disclosure provides a method for training an autonomous vehicle. The method includes obtaining trajectories of a plurality of vehicles, identifying each pair of vehicles from the plurality of vehicles with a between-vehicle-distance that is less than a threshold, normalizing the trajectories of each pair of vehicles, learning features of each normalized trajectory, clustering each trajectory based on the learned features, and training the autonomous vehicle based on the learned features.

The method can include the clustering can being done using k-means clustering. The clustering can include clustering each trajectory into one of a plurality of clusters, the number of clusters selected in order maximize between-cluster distance and minimize within-cluster distance. The learning can be done using an autoencoder selected from: a long-short term memory autoencoder, a normalized Euclidean distance long-short term memory autoencoder, or a dynamic time warping convolutional autoencoder. In the method, the features can be extracted from a hidden layer of the autoencoder. The learning can be unsupervised learning based on a plurality of feature vectors corresponding to driving encounters, wherein the plurality of feature vectors are extracted by the driving encounter feature extractor. In the method for training an autonomous vehicle, the threshold can be about 100 meters.

These and other features, aspects, and advantages of the present invention will become better understood upon consideration of the following detailed description, drawings and appended claims.

BRIEF DESCRIPTION OF THE DRAWINGS

FIGS. 7A-7D show examples of learning representations by different approaches. FIG. 7A shows raw driving encounter GPS trajectories with start points. FIG. 7B shows extracted representations using dynamic time warping (DTW). FIG. 7C shows reconstructed representations of DTW using convolutional autoencoder (ConvAE). FIG. 7D shows extracted representations of using normalized Euclidean distance (NED) of two trajectories and its reconstructed representation from long-short term memory autoencoder (LSTMAE).

FIGS. 8A-C shows results for DTW-ConvAE, NED-LSTMAE, and LSTMAE respectively.

FIGS. 9A-9D compares all approaches to cluster driving encounters through showing the within- and between-cluster metrics (BC and WC), as shown in FIGS. 9A and 9C respectively, and their change rates over the number of clusters k, as shown in FIGS. 9B and 9D respectively.

DETAILED DESCRIPTION OF THE INVENTION

Driving encounter classification and analysis can benefit autonomous vehicles to achieve a more smart decision. This disclosure presents an unsupervised learning framework to classify driving encounter which composes of two vehicles' GPS trajectories ordered by time. We developed two kinds of approaches, including deep autoencoders and distance-based approaches, to learn underlying representations in terms of both shape and distance of driving encounters. Five specific approaches were developed and evaluated by combining the deep autoencoders and the distance-based approaches. We then applied k-means clustering to categorize driving encounters into several distinguishable groups based on the learned representations. The effectiveness of our unsupervised learning framework for driving encounter classification was demonstrated based on 2568 naturalistic driving encounters, comparing with the state-of-the-art deep learning methods.

Driving Encounter Classification Framework

Figure 1:
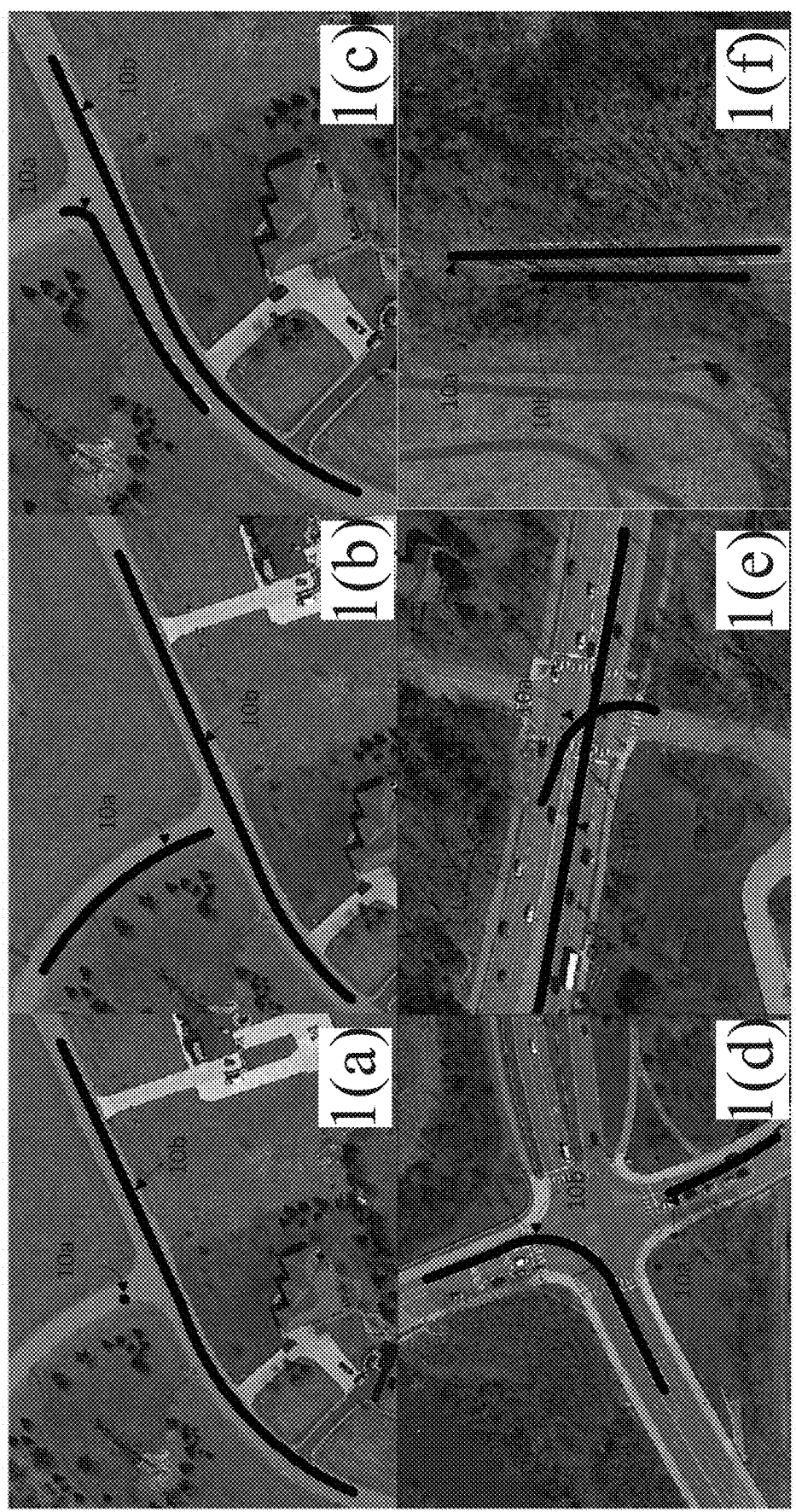
FIG. 1 shows various exemplary driving encounters.
Figure 2:
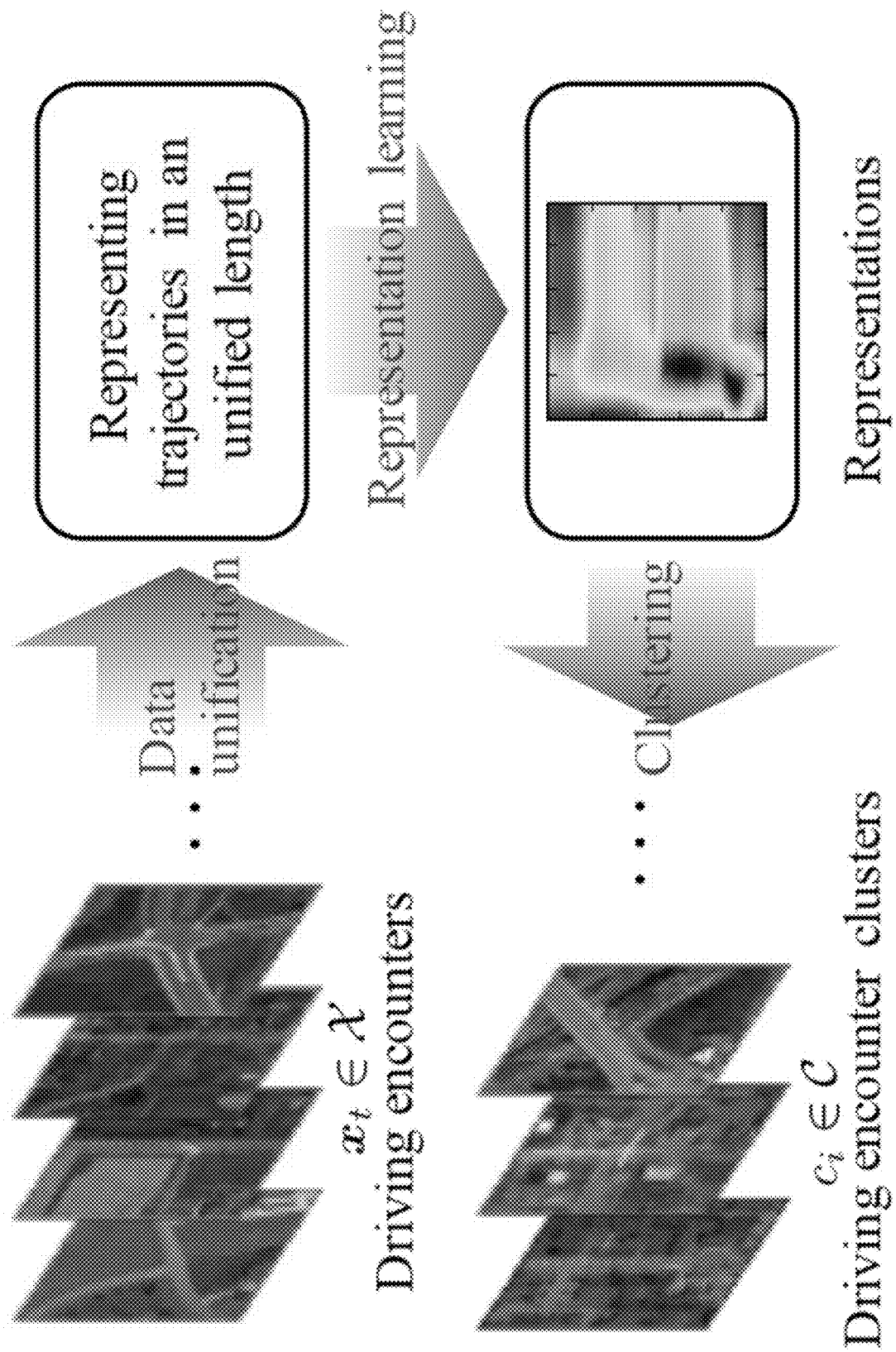
FIG. 2 shows various exemplary steps of unsupervised classification of driving encounters.

As shown in FIG. 2, unsupervised classification of driving encounters can include three steps: driving encounter unification, representation extraction, and clustering. Before detailing the framework, we first introduce some mathematical preliminaries to define the driving encounter.

Driving Encounters

Figure 3:
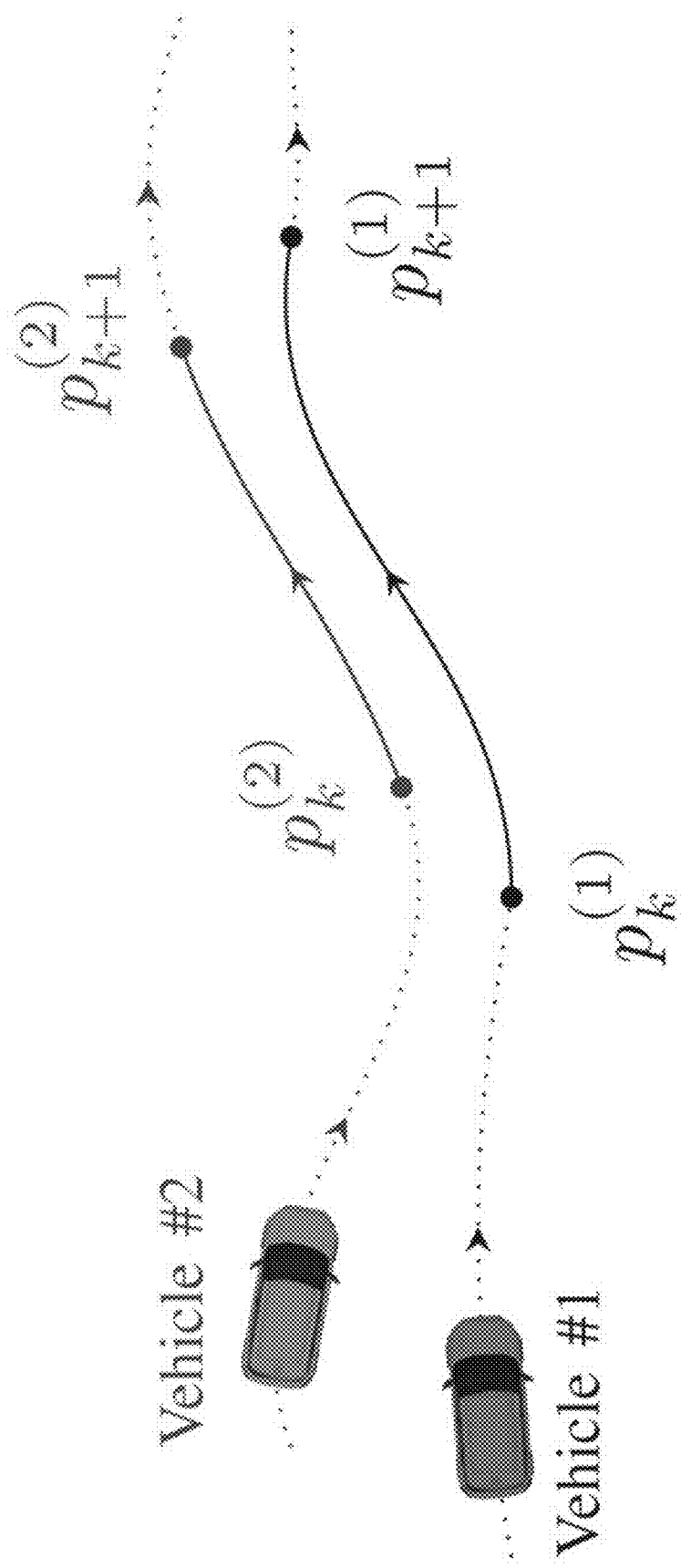
FIG. 3 illustrates an exemplary driving encounter.

A driving encounter can be composed of two vehicle trajectories with the same length of time, where the vehicle trajectories could be continuous or discrete. In our case we may only consider the discrete trajectories and define as follows. Given a discrete observed driving encounter $$x=\{(p_1^{(1)},p_1^{(2)},t_1),\ldots,(p_k^{(1)},p_k^{(2)},t_k),\ldots,(p_K^{(1)},p_K^{(2)},t_K)\} \quad (1)$$

where $p_k^{(1)} \in \mathbb{R}^2$ and $p_k^{(2)} \in \mathbb{R}^2$ are the positions of two vehicles in the driving encounter at discrete time $t_k$, $K \in \mathbb{N}$ is the length of the driving encounter x, as shown in FIG. 3. In particular, we define $X=(x_1, x_2, \ldots, x_N)$ as a set of driving encounters with the number of N.

Driving Encounter Unification

For some clustering algorithms, driving encounters are required to be set as a unified length so that they could be well measured. For two arbitrary driving encounters, their length may be largely different from each other in real traffic. In order to make clustering algorithms tractable for driving encounters, we need to normalize the driving encounters into the same length with little loss of information. Many mature approaches of normalizing trajectories have been developed, see review literature (Ref. 22). Some exemplary approaches are listed below.

Trajectory transformation algorithms, which projects the trajectories into another structured space with fixed parameter. Some popular methods include linear transformation, curving fitting (e.g., uniform cubic B-spline curve), discrete Fourier transformation, etc.

Re-sampling methods, which chooses trajectory points by sampling rule to normalize trajectory lengths with minimal information loss. The re-sampling method with interpolation processes can be very flexible to operate.

Trajectory substitute, which utilizes the basic components of trajectories, termed as sub-trajectories, to represent describe hidden information of original trajectory data.

Points of interest, which is flexible and preferable when research focuses on some specific regions of surveillance area, termed as points of interest, rather than the points outside the regions.

Scale-invariant features, which has been widely used to extract more robust and representative features (e.g., histograms of oriented gradients and histograms of optical flow) from image frames rather than only the position of trajectories.

Trajectory transformation algorithms and re-sampling methods may be implemented with less computational cost than other methods.

Representation Learning

Since the driving encounter is represented as time-series data sequences, it is nontrivial to directly feed the data into clustering algorithms. In order to classify driving encounters into distinguishable groups, we need to select representations capable of characterizing these driving encounters, thus allowing to minimize the difference within clusters and maximize the difference between clusters in terms of the learning representations, instead of directly operating on vehicle trajectories. There are many different approaches to extract representations of driving encounters with respect to their shape or distance, for example, by measuring the distance (Ref. 3, 10) between two trajectories or by using neural networks to learn representations of trajectories (Ref. 11, 23).

In order to distinguish driving encounters and categorize them into groups, certain features capable of capturing the underlying characteristics of the driving encounters should be carefully extracted. Improper representation can lead to unsatisfied results. Therefore, extracting representations from driving encounter is of importance to get satisfied classification performance. Unlike extracting features of images with specific and explicit labels, we can have rare knowledge about the feature space of driving encounters. Fortunately, many approaches to learning representations of time-series trajectories have been developed, which can be taken as reference since driving encounter in nature is also time-series data sequences. In this section, three ways to learn the representations of vehicle trajectories are presented: deep autoencoder, distance-based measure, and shape-based measure.

Deep Autoencoder

Figure 4:
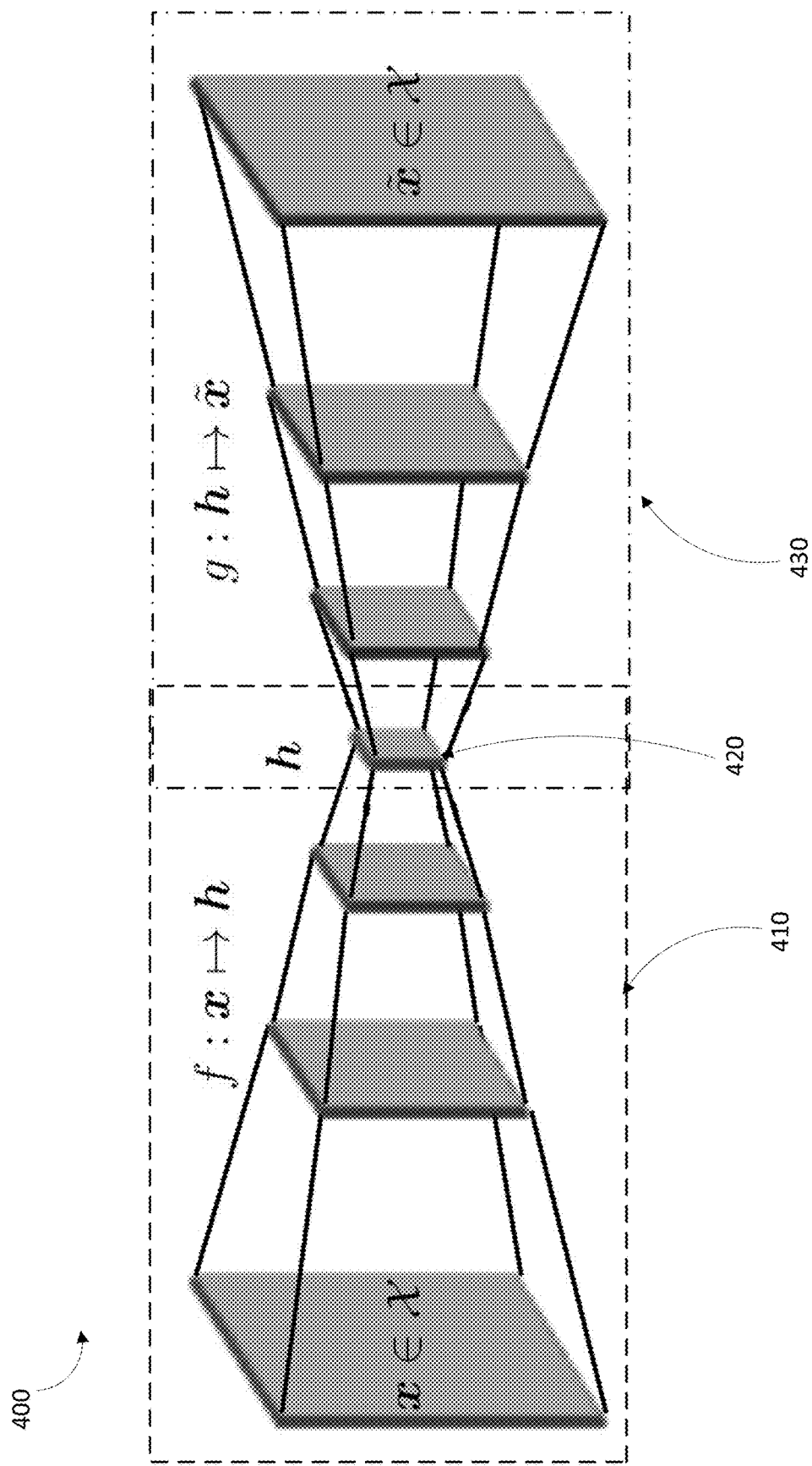
FIG. 4 illustrates an exemplary autoencoder.

Our goal is to find a representation which can characterize a given driving encounter. For the autoencoder, it has been widely used to dig underlying information of time-series data. An autoencoder is a neural network (NN), consisting of encoder and decoder (as shown in FIG. 4), that attempts to copy its input x to its output z, where the hidden layer h describes the code to represent the input x. By training a model to minimize the difference between x and x, the hidden layer h can be treated as a representation of characterizing this driving encounter. Autoencoder varies over the ways to connect the encoder and the decoder, for example, a structure of long-short term memory (LSTM) will make a LSTM autoencoder and a structure of convolutional NN (CNN) will make a convolutional autoencoder. In general, the encoder and the decoder can be mathematically detailed as follows.

Encoder

As shown in FIG. 4, the autoencoder 400 can have an encoder 410. The encoder can include multilayer neural networks, mapping an input $x_i \in \mathbb{R}^{r \times s}$ at the $i^{th}$-layer into $x_{i+1}$ at the $(i+1)^{th}$-layer by $$x_{i+1} = w_{i,i+1}^T x_i + b_i \quad (2)$$

where $w_{i,i+1} \in \mathbb{R}^{r \times s}$ is the weight vector, $b_i \in \mathbb{R}^s$ is the bias vector, $x_{i+1} \in \mathbb{R}^{s \times d}$. The autoencoder 400 can include a middle layer 420, which can be the representation h of a driving encounter.

Decoder

The hidden representation h from the encoder is then mapped back to z through a symmetric multilayer network.

Subsequently, an autoencoder involved simple multilayer perception can be easily derived using (2) without concerning the past information of observation, which has been investigated in (Ref. 20). For driving behavior, however, previous research demonstrates that it is dynamic process in nature with related to past information (Ref. 24), (Ref. 25). Hence, in this disclosure, we take the past information of observation into consideration by employing two advanced autoencoders: LSTM-Autoencoder (LSTMAE) and convolutional autoencoder (ConvAE).

LSTMAE

In contrast to the simplest autocoder with a multilayer perception, the LSTMAE (Ref. 26) takes advantage of the previous information by adding an information selection function, usually as a sigmoid neural net layer, to decide what information is useful and to remember this helpful information, thus transferring the observation $x_i$ at the $i^{th}$-layer to the representation at the $(i+1)^{th}$-layer. Instead of using (2), the LSTMAE introduces four basic equations to achieve this, formulated by $$z_i = \sigma(w_z^T l_i + u_z x_{i-1} + b_z) \quad (3a)$$

$$y_i = \sigma(w_y^T l_i + u_z x_{i-1} + b_y) \quad (3b)$$

$$\hat{x}_i = \tan h(w_h^T l_i + u_h y_i x_{i-1} + b_l) \quad (3c)$$

$$x_i = (1-z_i) x_{i-1} + z_i \hat{x}_i \quad (3d)$$

where $\sigma(\cdot)$ is the sigmoid function, $w_z$, $w_y$, $w_l$ are the weights, $b_z$, $b_y$, $b_l$ are the biases, $x_i$ is the output vector of the LSTM unit. Therefore, given observation $x_{i-1}$ for each LSTM unit, we can get the output $x_i$ to next layer.

Convolutional Autoencoder (ConvAE)

Sharing the same structure with LSTMAE, the ConvAE describes the layer relationship using a convolutional operator, instead of using a basic multiply operator. In fact, the encoding and decoding processes can be treated as a procedure of reconstructing observations and hence we can learn hidden representation h by solving the following optimization problem of minimizing the errors between reconstructed observations ~x and the origin inputs x with the cost function $$\theta^* = \arg \min_\theta E(\theta) \quad (4)$$

where $E(\theta) = (x - \tilde{x})^T (x - \tilde{x})$ and $\theta = _{i=1}^I$ for all layers, where I is the number of layers. From aforementioned discussion, the representation learning process can be transformed into an issue of training autoencoders, then recording information of the middle layer h (i.e., the layer of hidden presentation) in feature space $H \in \mathbb{R}^{r \times 1}$ for each driving encounter x, where r is the dimension of hidden layer.

Distance-Based Measure

In addition to treat the representation learning process as a black box, we can also use a mathematically rigorous way to capture their distance characteristics. In order to describe the distance relationship between two trajectories in a driving encounter, we need to define a measure to gauge their geometrical distance. Generally, there are two typical ways or formulas to achieve this, i.e., dynamic time warping and Euclidean distance, discussed as follows.

Dynamic Time Warping (DTW)

Given a driving encounter observation x, the objective of DTW (Ref. 27) is to measure the geometric relationship of the two vehicle trajectories $$p^{(1)} = (p_1^{(1)}, \ldots, p_k^{(2)}, \ldots, p_K^{(1)})$$

$$p^{(2)} = (p_1^{(2)}, \ldots, p_k^{(2)}, \ldots, p_K^{(2)})$$

with a length of K. In what follows, we will introduce trajectory measure space denoted by $P \in \mathbb{R}^{K \times K}$, with $p_m^{(1)}$, $p_n^{(2)} \in P$ for m, n, $\in [1, \ldots, K]$. To evaluate the relationship between trajectories $p^{(1)}$ and $p^{(2)}$ in a driving encounter, we introduce a local distance measure, defined by $$f: P \times P \rightarrow \mathbb{R}_{\geq 0} \quad (5)$$

Typically $f(p_m^{(1)}, p_n^{(2)})$ is small if $p_m^{(1)}$ and $p_n^{(2)}$ are close to each other, and otherwise $f(p_m^{(1)}, p_n^{(2)})$ is large. Thus by evaluating each pair of elements in the vehicle trajectories $p^{(1)}$ and $p^{(2)}$, we can obtain the corresponding feature matrix $F \in \mathbb{R}^{K \times K}$ to represent the geometry of driving encounter x, where $$F(m,n) := f(p_m^{(1)}, p_n^{(2)}) \quad (6)$$

Here the Euclidean distance is selected to compute the local distance and computed by $$f(p_m^{(1)}, p_n^{(2)}) = \|p_m^{(1)} - p_n^{(2)}\|_2 \quad (7)$$

Similar to the DTW distance, other distance measures can also be selected such as LCSS, edit distance for real sequence (EDR). They discrete the trajectories of driving encounter and account the number of occurrences where the Euclidean distance between matched segments does not match a predefined spatial threshold. Compared to DTW, both of LCSS and EDR are sensitive to the spatial threshold (Ref. 10), that is, a large threshold value indicates a high acceptation of differences in trajectories and otherwise, a low tolerance of differences.

Normalized Euclidean Distance (NED)

The other simple and efficient way to measure the distance between driving encounters is to apply a normalized Euclidean distance directly, which is computed by $$F = \frac{|p^{(1)} - p^{(2)}|}{\max(|p^{(1)} - p^{(2)}|)} \quad (8)$$

Thus we can obtain the feature F of this driving encounter. Other kinds of distance measure could also be flexible used.

Shape-Based Measure

Different from the distance-based measure, the shape-based measures have also been used to capture the geometric features of two single trajectories (Ref. 3), (Ref. 10). The most well-known shape-based measures are the Hausdorff distance (Ref. 28), the Fréchet distance (Ref. 29), and the symmetrized segment-path distance (SSPD) developed in (Ref. 10). These methods have registered a high level of performance for describing the geometric features of a single trajectory; however, they are not suitable for the relationship between driving encounters consisting of a pair of vehicle trajectories, since their output is a metric and easy to measure the shape-similarity level of two individual trajectories but not work for pairs of two trajectories.

Because even for driving encounters with the same metric value, the driving encounters could be greatly different from each other in terms of shape. Therefore, the shape-based measure is not applied in this disclosure.

Summary of Approaches

According to the above discussion, we select the neural network-based autoencoder and distance-based measure to learn features representative of driving encounters. Besides, the autoencoder is able to uncover underlying information with dimension reduction and hence it can potentially extract meaningful representations from the results of DTW or NED. There are five combination ways to learn representations from driving encounters, listed as follows:

DTW: directly using output of DTW as representations, i.e., $$DTW: x \xrightarrow{(6)} F$$

NED: directly using output of NED as representations, i.e., $$NED: x \xrightarrow{(8)} F$$

LSTMAE: Applying LSTMAE to extract underlying representations of driving encounters, i.e., $$LSTMAE: x \xrightarrow{LSTMAE} h$$

DTW-ConvAE: combining ConvAE with DTW to extract underlying representations, i.e., $$DTW\text{-}ConvAE: x \xrightarrow{(6)} F \xrightarrow{ConvAE} h$$

NED-LSTMAE: combine LSTMAE with NED to extract underlying representations, i.e., $$NED\text{-}LSTMAE: x \xrightarrow{(8)} F \xrightarrow{LSTMAE} h$$

To understand easily, we display and compare the input and output for each representation extraction method in Table 1. In order to follow easily, we denoted $\mathcal{F}_{x_i}$ as the extracted representation F or h of driving encounter $x_i$ for all approaches in Table 1, where K is the dimension of inputs and r is the dimension of the learned representations.

TABLE 1

INPUT AND OUTPUT OF REPRESENTATION LEARNING APPROACHES

| Method | Input Observations | Output Features |
|---|---|---|
| DTW | $x \in \mathbb{R}^{K \times d}$ | $F \in \mathbb{R}^{K \times K}$ |
| NED | $x \in \mathbb{R}^{K \times 1}$ | $F \in \mathbb{R}^{K \times 1}$ |
| LSTMAE | $F \in \mathbb{R}^{K \times 1}$ | $h \in \mathbb{R}^{r \times 1}$ |
| DTW-ConvAE | $F \in \mathbb{R}^{K \times K}$ | $h \in \mathbb{R}^{r \times 1}$ |
| NED-LSTMAE | $F \in \mathbb{R}^{K \times 1}$ | $h \in \mathbb{R}^{r \times 1}$ |

Clustering

This section will introduce a clustering approach for the learned representations. We first detail the clustering method and then introduce the qualification criteria of clustering results.

Methods

Time-series trajectories clustering is very ubiquitous (Ref. 30), and a wealth of clustering algorithms has been developed to solve related problems (Ref. 31). Clustering method selection is restricted by the characteristics of the driving encounter. Given the extracted representation of driving encounters in Table I, we can classify them into groups. In this disclosure, we can use k-means clustering (k-MC) (Ref. 32).

Performance Metric

For the clustering task, we do not exactly have the prior knowledge of cluster number. Therefore, we need to define a criterion to evaluate the clustering performance. Our aim is to gather the driving encounters with similar characteristics into one group that is greatly far from other groups. Hence, the quality of clustering results can be assessed by checking the between and within variances of the obtained clusters. On the other hand, the variance of the elements in the same groups should be as small as possible. Here (according to Refs. 10, 30, 31), we should define the within-cluster (WC) variance and between-cluster (BC) variance, which requires compute a mean value of extracted features.

However, in our case, directly computing the mean of driving encounters is not tractable since it is inconceivable and meaningless to calculate the mean of trajectories in driving encounters. In this disclosure, instead of directly using the vehicle trajectories to evaluate the BC and WC variances, we make the advantages of the extracted representations and introduce the mean of the extracted representations, denoted by $\bar{\mathcal{F}}_\chi$, which is computed by averaging all extracted representations within the cluster $\chi$. Let $\chi_1, \chi_2, \ldots \chi_J$ be the set of clusters of driving encounters x. Then the BC variance and WC variance can be derived by $$BC = \frac{1}{J-1} \sum_{j=1}^{J} \mathcal{D}(\bar{\mathcal{F}}_x, \bar{\mathcal{F}}_{x_j}) \quad (9a)$$

$$WC = \frac{1}{K-J} \sum_{j=1}^{J} \frac{1}{|x_i|} \mathcal{D}(\mathcal{F}_{x_j}, \bar{\mathcal{F}}_{x_j}) \quad (9b)$$

In such way, the BC and WC variances between approaches become comparable through scaling their values into [0, 1] with respect to each approach. A large value of $\lambda_{BC}$ indicates a far distance between clusters and otherwise, a close distance.

Example

The following Example is provided to demonstrate and further illustrate certain embodiments and aspects of the present invention and is not to be construed as limiting the scope of the invention.

Data Collection and Analysis

All the driving data were collected from naturalistic settings supported by the University of Michigan Safety Pilot Model Development (SPMD) program (Ref. 33). This database was conducted by the University of Michigan Transportation Research Institute (UMTRI) and provides driving data logged in the last five years in Ann Arbor area. It includes approximately 3,500 equipped vehicles and 6-million trips in total. Latitude and longitude information of each vehicle was collected by the on-board GPS. The collection process starts at the ignition for each equipped vehicle. The data was collected with a sampling frequency of 10 Hz.

B. Experiment Procedure and Settings

Figure 5:
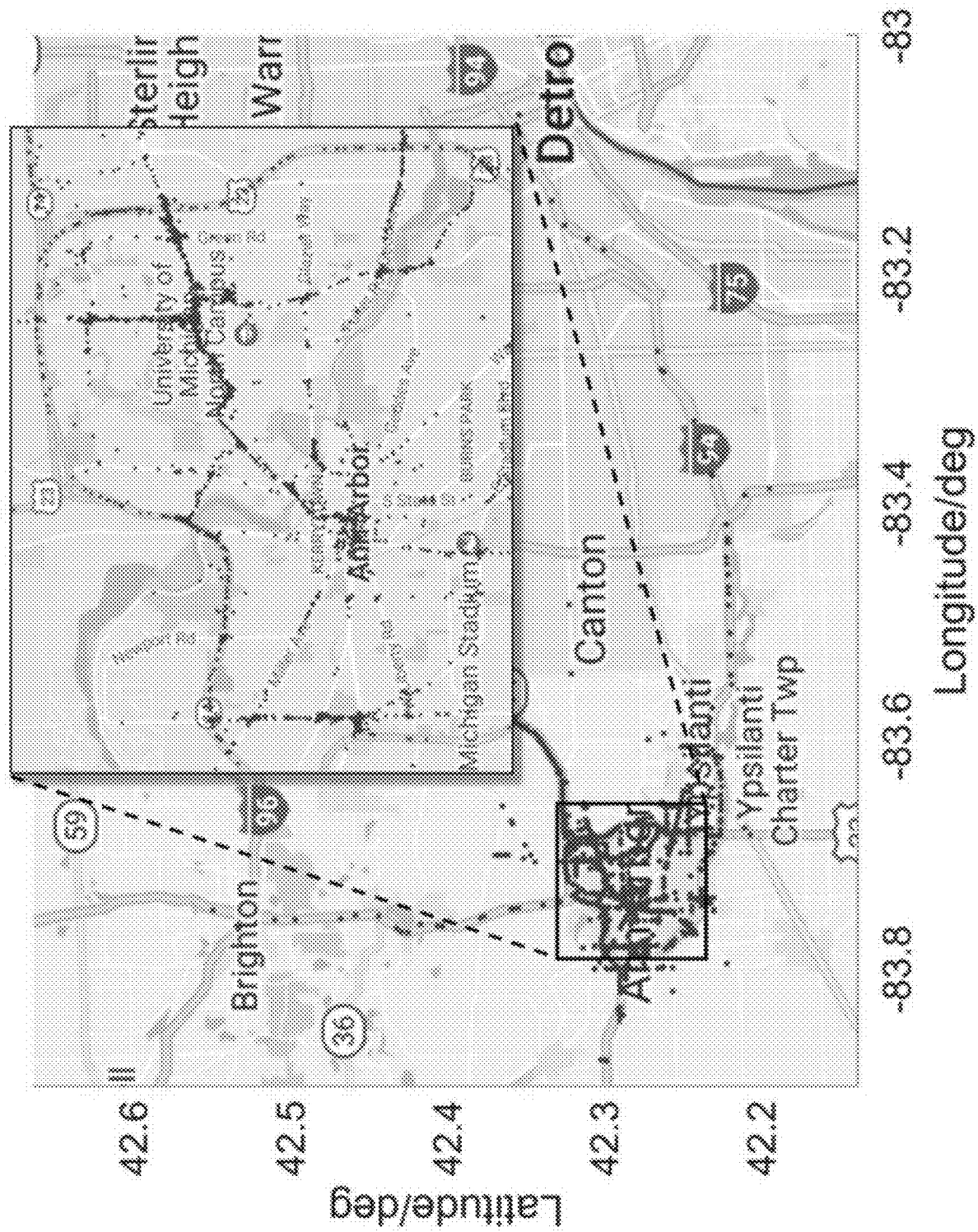
FIG. 5 shows an exemplary geographical selection range of driving encounters in an urban area.
Figure 6:
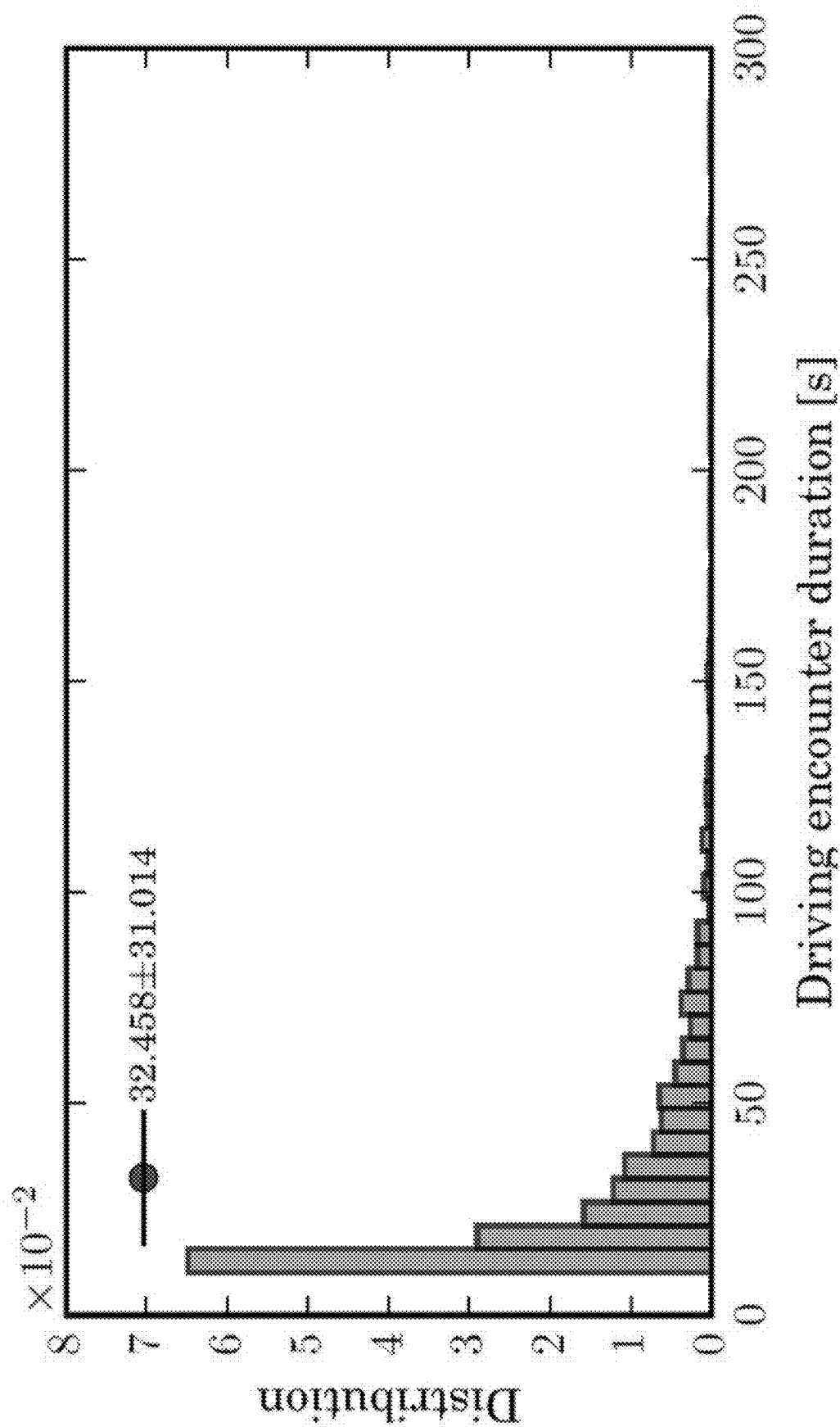
FIG. 6 displays the distribution of duration length of origin driving encounters.

1) Autoencoders:

We searched the dataset of 100,000 trips, collected from 1900 vehicles with 12-day runs. The trajectory information we extracted includes latitude, longitude, speed of the vehicles. The selection range was constricted to an urban area with the latitude in (−83.82, −83.64) and the longitude in (42.22, 42.34), as shown in FIG. 5. The vehicle encounter was defined as the scenario where two vehicles are close to each other and the relative Euclidean distance between them is small than 100 m. The dots indicate the position of the vehicle at every sample time. After querying from the SPMD database, we got 49,998 vehicle encounters. In the case where the distance between two vehicles is less than 100 m, then for a short second, they were out of the range to communicate with each other, which results in very short trajectories. In this disclosure, we mainly focus on the trajectory length larger than 10 s, which will be very meaningful for behavior analysis and applications. Finally, we obtained 2,568 satisfied driving encounters for experimental validation. FIG. 6 displays the distribution of duration length of all origin driving encounters. In order to make feature extraction tractable, we used the re-sampling method through an interpolation process to normalize the driving encounter into identical length.

From FIG. 6, it can be seen that the length of driving encounters was various. In order to facilitate the training procedure, we empirically unified each driving encounter to a fixed length of 200 sample points using linear interpolation. Here, we selected the unified length of 200 with the fact that a small number of unified samples will reduce model accuracy while a high number of unified samples will increase computational burden without significantly model performance improvement.

Setting an optimal number of layers in autoencoder is a challenging and open-end problem, because there is no general design rule that can be universally used to solve all problems. We set all autoencoders with a symmetric structure according to our experiences, and more specifically, LSTMAE: A fifth-layer (l=5) LSTMAE was designed for the deep representation, where the fourth layer (i.e., middle layer) is the hidden representation of driving encounter. The weights for each layer were initialized using random numbers between 1 and −1 following uniform distribution. The dimension of the middle layer (i.e., hidden layer) was set as 10, i.e., $h \in \mathbb{R}^{r \times 1}$ with r=10.

ConvAE: A fifth-layer ConvAE was designed to extract underlying features from outputs of DTW. The dimension of its hidden layer was also set as 10, i.e., $h \in \mathbb{R}^{r \times 1}$ with r=10. After learning the hidden feature $\mathcal{F}_{x_i}$ of driving encounter $x_i$ using autoencoders, we then applied the k-means clustering (k-MC) approach to these extracted hidden representations to cluster driving encounters.

2) DTW:

Similarly to autoencoders, the length of driving encounters was unified to 100 for DTW in order to balance the model accuracy and computational burden of representation learning. Thus we can compute the representation $\mathcal{F}_x \in \mathbb{R}^{100 \times 100}$ using (7) for each driving encounter.

3) NED:

For the normalized Euclidean distance approach, the representation can be directly computed through (8) based on the unified driving encounters. For all learned representations, we do not have any prior knowledge of what values of $k \in \mathbb{N}^+$ pet. In order to determine k, we run clustering algorithms with different k and computed their performance metric $\lambda_{BC}$ and $\lambda_{WC}$.

Result Discussion and Analysis

This section will present and analyze the experiment results, covering representation extraction results and clustering performance evaluation and comparison.

Representation Learning and Analysis

Figure 7C:
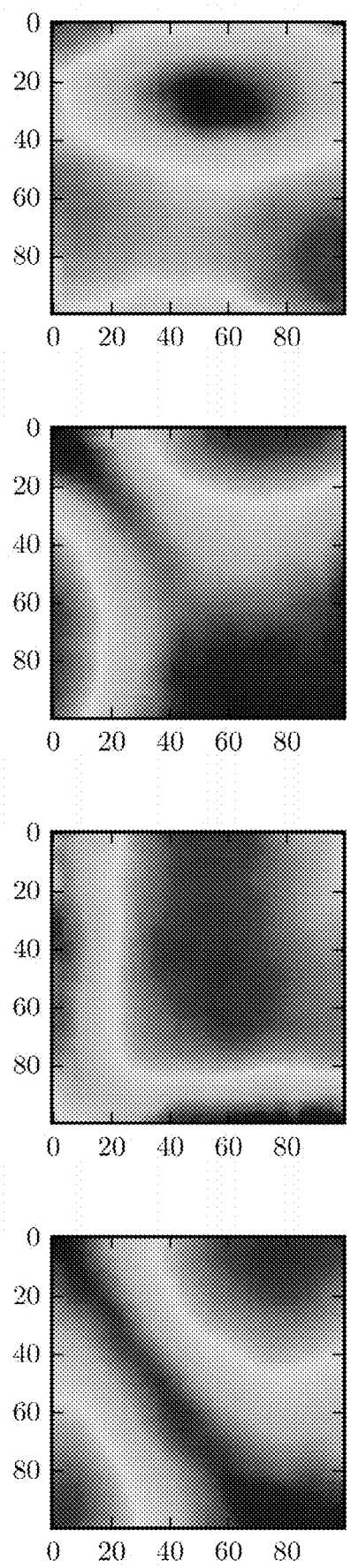
Figure 7D:
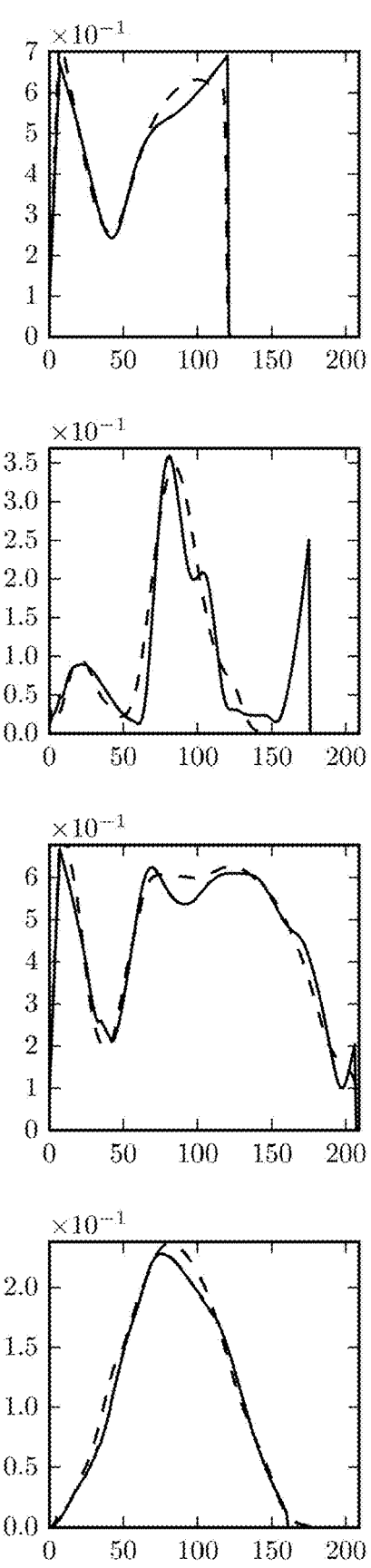

FIG. 7 shows examples of learned representations using DTW and NED as well as the reconstructed results of using LSTMAE and ConvAE. FIG. 7A shows raw driving encounter GPS trajectories with start points. FIG. 7B shows extracted representations using DTW. FIG. 7C shows reconstructed representations of DTW using ConvAE. FIG. 7D shows extracted representations of using NED of two trajectories and its reconstructed representation from LSTMAE. It can be seen that the autoencoders of both LSTMAE and ConvAE successfully reconstruct the representations of DTW and NED, which implies that the learned hidden layers of autoencoders can represent the associated driving encounters.

Learned Representations Using DTW and NED

FIG. 7 shows examples of the learned representations using DTW and NED. It can be known that both DTW and NED methods can capture the distance information of two trajectories in an individual driving encounter. In the extracted representations of using DTW, deep red indicates a large value and deep blue indicates a small value. For DTW, it can capture the spatial information of all position over the whole trajectory. In addition, it also capture the dynamic information since it computes the distance of trajectories over time, while the NED does not capture the dynamic information. In addition, FIG. 7 presents the associated reconstructed outputs of DTW and NED. Experimental results demonstrate that the ConvAE and LSTMAE can capture the underlying information of the extracted representations using DTW and NED.

Learned Representations Using Autoencoders

Figure 8A:
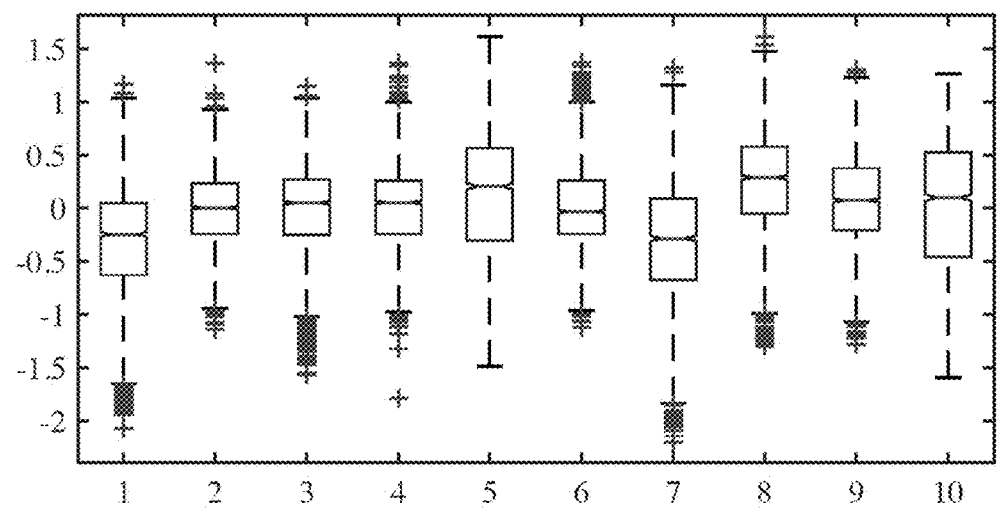
FIGS. 8A-8C show statistical results of extracted hidden features.
Figure 8B:
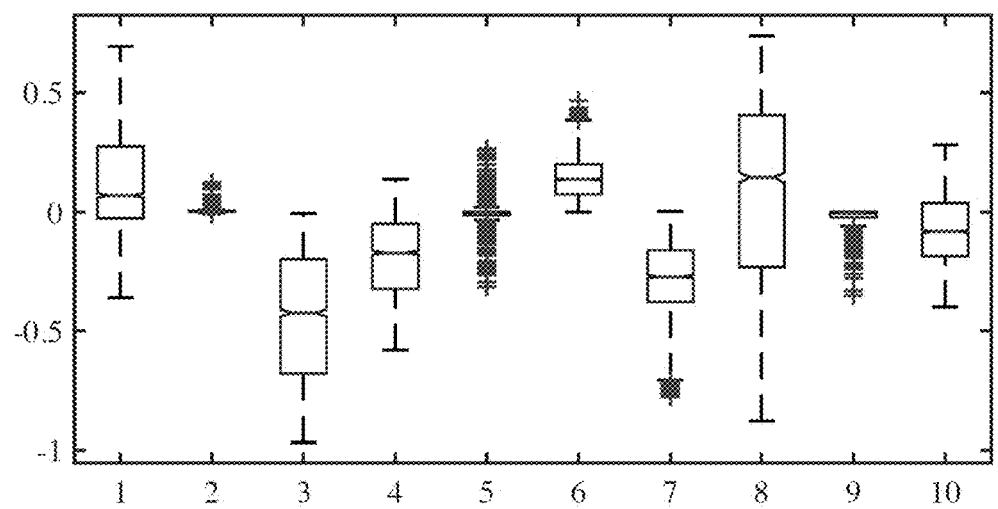
Figure 8C:
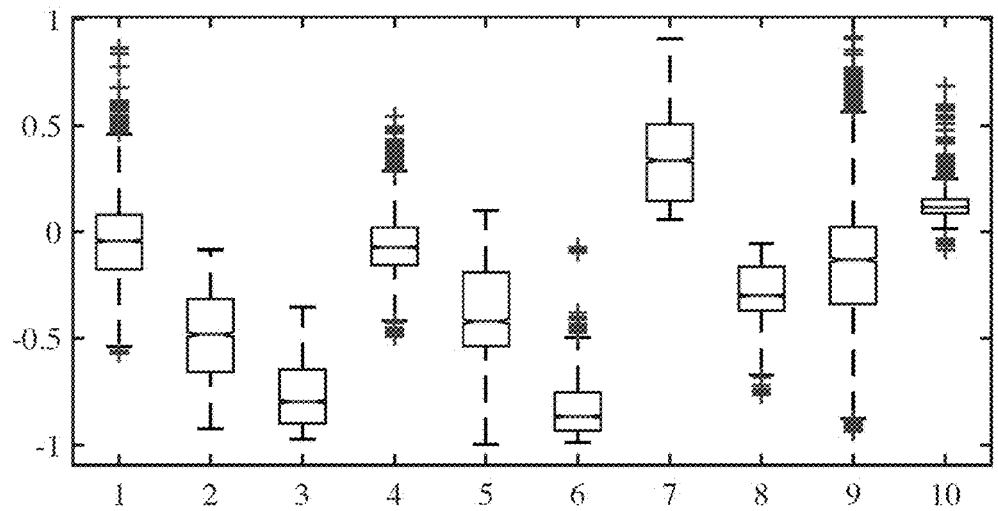

Each driving encounter endows a ten-dimensional representation in a vector $h \in \mathbb{R}^{10 \times 1}$ via autoencoders. FIG. 8 shows box plots of hidden layers in different autoencoders for all driving encounters. For each box, the central mark indicates the median, and the bottom and top edges of the box indicate the 25th and 75th percentiles, respectively. As shown in FIG. 8A, it can be found that DTWConvAE obtains recognizable hidden representations; that is, distributions between each element of representation h do not have significant differences, compared to NED-LSTMAE and LSTMAE, As shown in FIGS. 8B and 8C respectively. All elements in extracted representations using DTW-ConvAE have similar median values almost around zero and similar ranges of [25th, 75th] percentiles. For the NED-LSTMAE and LSTMAE methods, both of their hidden representations are recognizable, significantly differing from DTW-ConvAE. Their median values and ranges of [25th, 75th] percentiles are scatteredly distinctive.

Clustering Results and Analysis

Figure 9A:
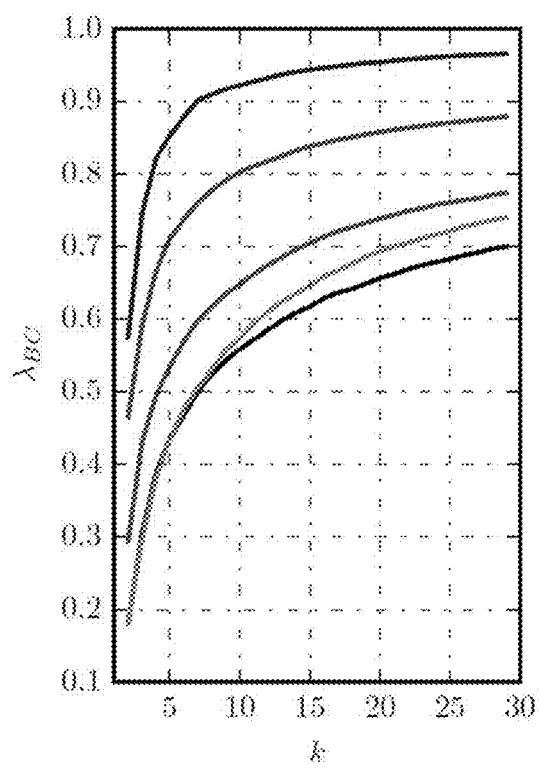
FIGS. 9A-9D show performance of between-clusters and within clusters distance using five representation extraction approaches.
Figure 9B:
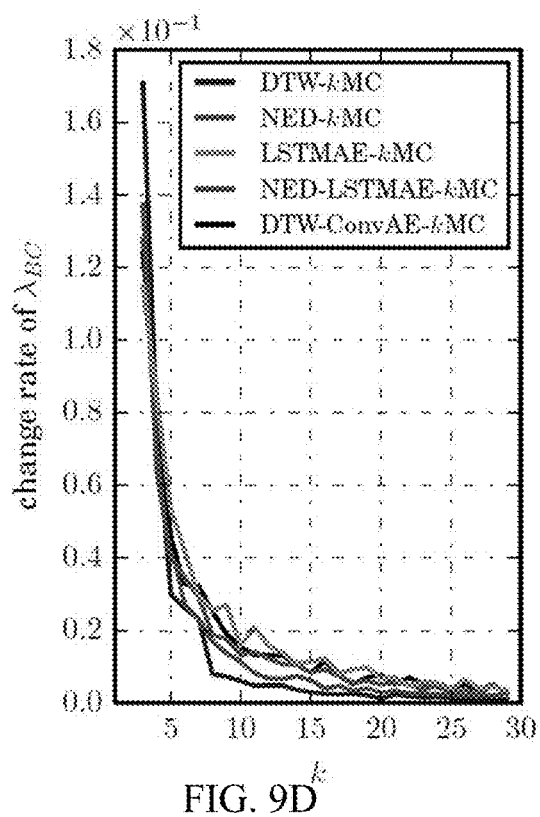
Figure 9C:
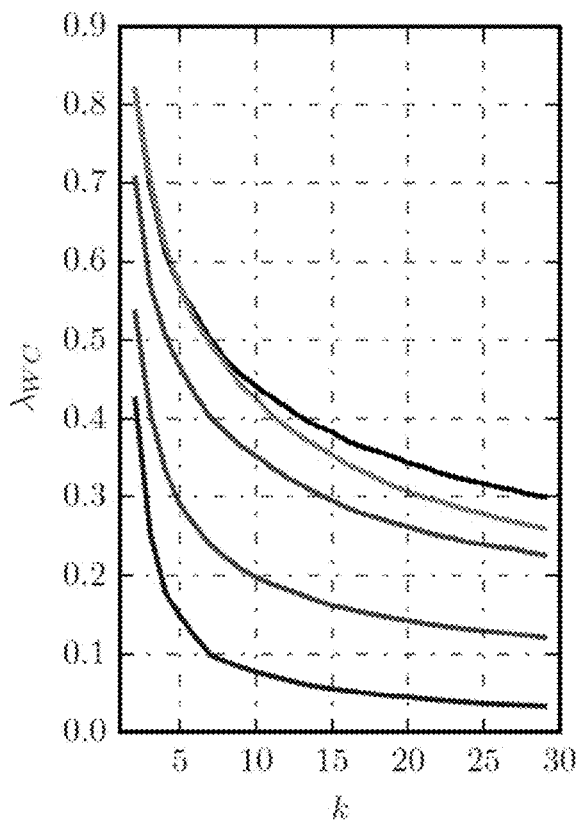
Figure 9D:
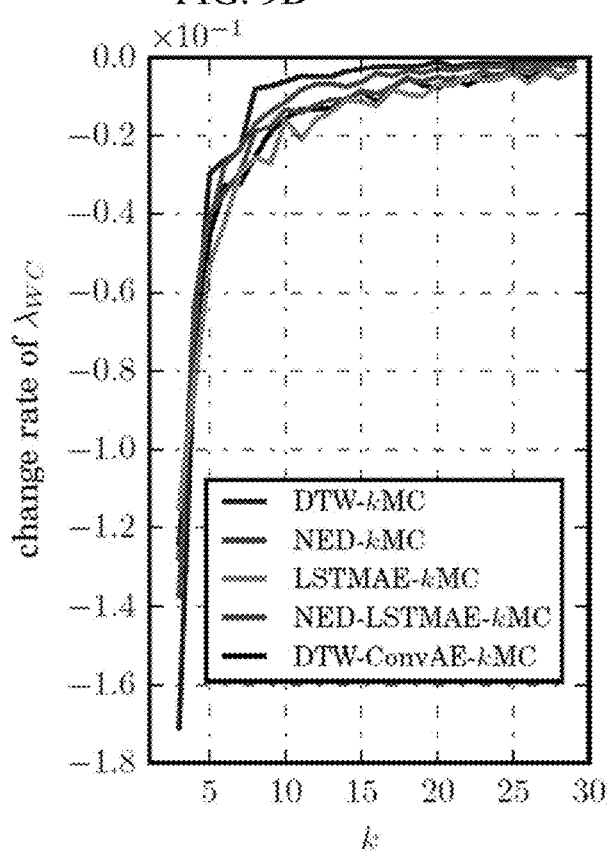

Based on the extracted representations, FIG. 9 compares all approaches to cluster driving encounters through showing the within- and between-cluster metrics (BC and WC), as shown in FIGS. 9A and 9C respectively, and their change rates over the number of clusters k, as shown in FIGS. 9B and 9D respectively. We found that the within-cluster distance decreases and the between-cluster distance increases with increasing the number of clusters. According to their change rate of BC or WC, it can be concluded that when the number of clusters k=10, their performance metrics would go to converge and change slightly, implying that k=10 is the preferred selection. As we discussed before, the goal of clustering is to put driving encounters into groups with maximizing the between-cluster distance and minimizing the within-cluster distance.

According to FIG. 9, it can be concluded that the DTW-kMC outperforms other counterparts, with BC=0:923 at k=10. For all autoencoders at k=10, the NED-LSTMAE-kMC obtains the best performance with BC=0:803, compared to LSTMAE-kMC with BC=0:574 and DTW-ConvAE-kMC with BC=0:559. This can be explained according to FIG. 8. The DTW-ConvAE-kMC (top in FIG. 8) obtains the worst performance as its extracted representations of driving encounters are not such recognizable and distinctive. For distance-based approaches, the DTW-kMC outperforms the NED-kMC with BC=0:648. This is because the DTW can capture the dynamic features over time as well as the distance features of two trajectories; however, the NED could not.

Figure 10:
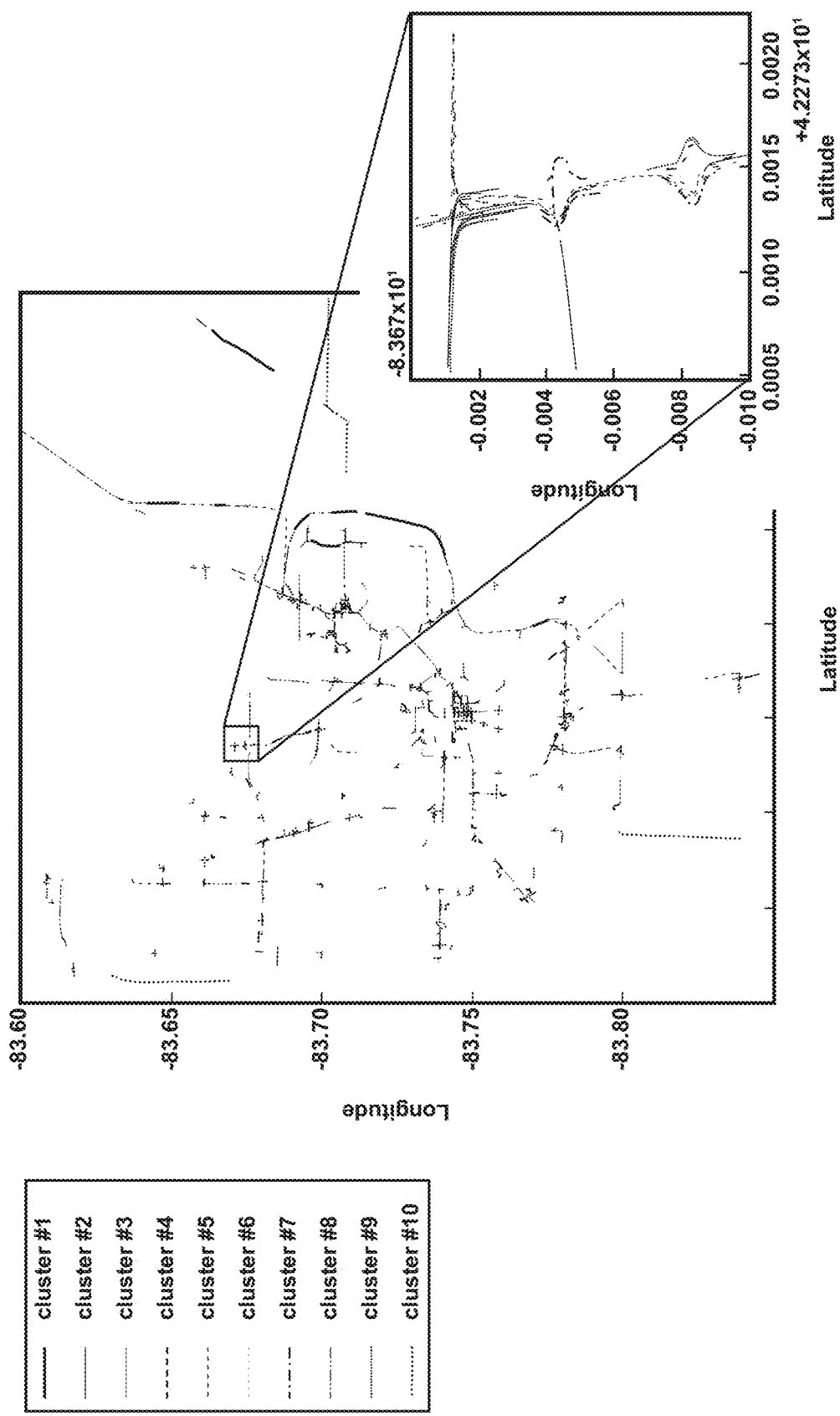
FIG. 10 shows visual GPS data of clustering results using DTW-kMC with k=10.
Figure 11:
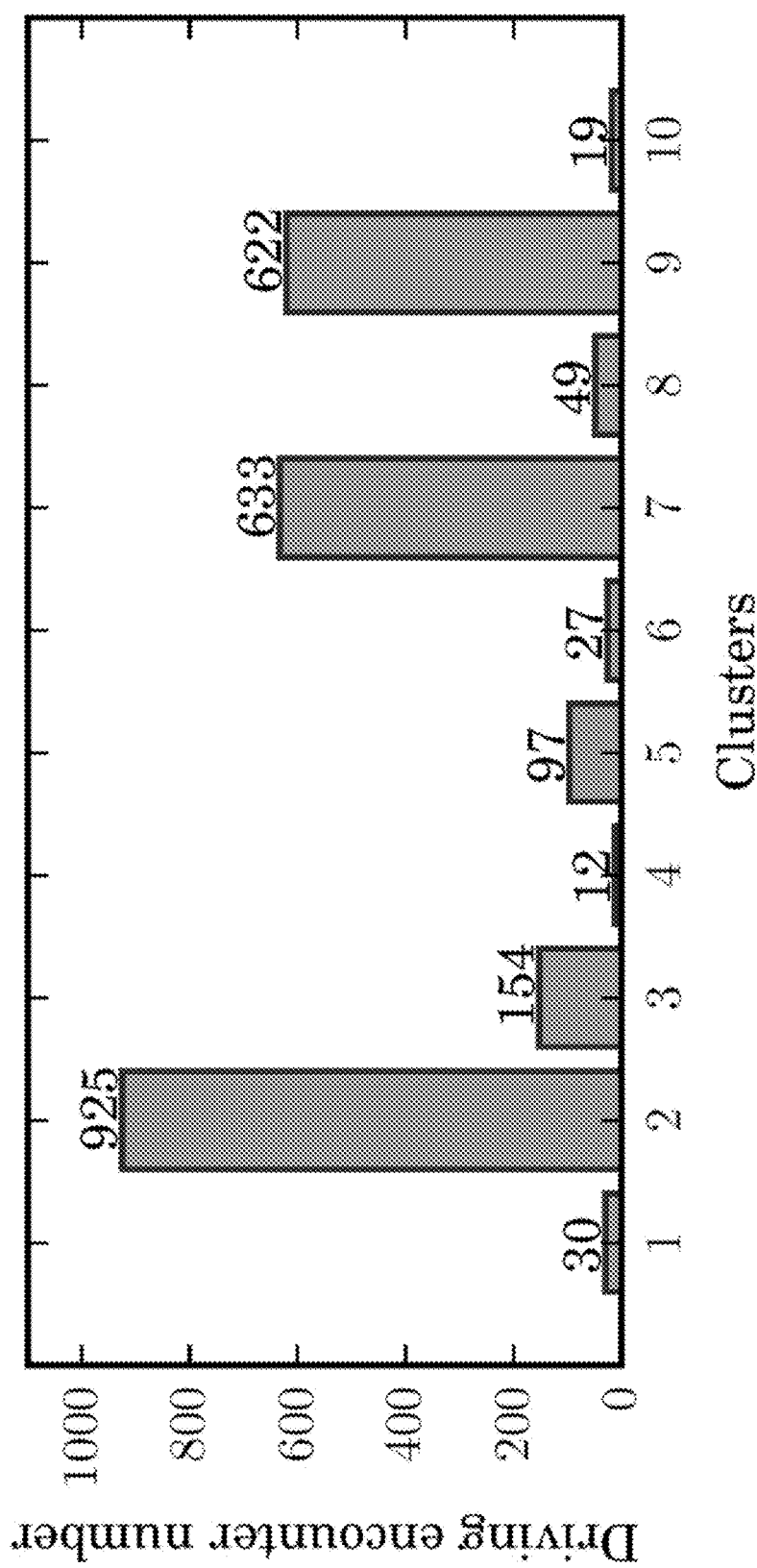
FIG. 11 shows clustering results of using DTW-kMC with k=10.

FIG. 10 displays the visual results of all clustered driving encounters with their GPS data. Here we only show the results with the optimal number of clusters k=10 because we have seen in FIG. 9 that a plateau can be observed on the change rate of within-cluster criteria $\lambda_{BC}$ with respect to the number of cluster starting at cluster sizes of 10 for all approaches. FIG. 11 lists the amount of driving encounters in each cluster. It can be found that some clusters covering very common driving encounter behaviors (e.g., cluster #2, cluster #7 and cluster #9) and some clusters representing rare driving encounter behavior (e.g., cluster #4 and cluster #10) can be detected.

TABLE 2

Efficiency Comparison of Representation Extraction Approaches

| Methods | Computing Time | Unit of Time |
|---------|----------------|--------------|
| NED | 101.41 | Second |
| DTW | 120.77 | Second |
| LSTMAE | ≈ 10 | Hour |
| ConvAE | ≈ 5 | Hour |

Computing Efficiency Analysis

In order to evaluate the conservativeness of the algorithm and its applicability to real-time applications, its computational costs when implemented on a standard laptop computer are presented and a comparison with other counterparts is given. All autoencoders were built using Python™ in Keras (see the resource identified as /building-autoencoders-in-keras.html at the domain name blog.keras.io), and all distance-based representation extraction algorithms were also programmed using Python™. Table 2 presents the average computation time for extracting representations on a standard laptop computer with an Intel® Core™ i7 running at 2.5 GHz, with 16 GB of RAM. It can be seen that the NED and DTW algorithms can extract feature much faster than two others, only with 120 s for 2568 driving encounters. However, the autoencoders with neural nets require few hours to extract representations.

Further Discussion

This disclosure presents a comprehensive investigation of driving encounter classification through five approaches, which can be categorized into two types: deep learning-based and distance-based. The distance-based method outperforms all other counterparts. However, some challenges still exist in our developed approaches and discussed as follows.

Layers of Autoencoders

For the deep learning-based approaches, we empirically set the hyperparameters of them, like the amount of decoder/encoder layers and the number of nodes between layers because there is no a general approach for all application cases to determine the optimal layers and nodes between layers. The hyperparameter selection in our disclosure mainly concerns two aspects: computational cost and model performance. Autoencoders with large numbers of layers could somewhat enhance model performance but at a significantly great computational cost. Therefore, in this disclosure we selected a moderate number of layers to learn hidden representation of driving encounters.

Contextual Road Information

This disclosure mainly utilized the vehicle trajectories of GPS data without any other information to group driving encounters since GPS data is very easy to obtain at a low cost such as via mobile-phone and equipped localization sensors. Our experiment validation did not consider other information such as contextual road information and vehicle speed, but it is flexible to extend our developed approach to other driving case of including high-dimensional time-series data. For instance, if more road context information could be obtained such as highway and intersections (T-shape, Y-shape, and cross-shape, etc.), our developed approached can help get insights into diversity of driving encounters. Therefore, considering road contextual information will be one of our future work.

This disclosure investigated the clustering problem of naturalistic driving encounters consisting of pairs of vehicle trajectories. Two kinds of representation learning ways—deep autoencoder and distance-based, including five specific approaches, were developed and evaluated. Clustering approaches, were considered, and k-means clustering was selected and evaluated. The clustering results can provide insights into driver interactive behaviors in different scenarios and help to design a friendly and efficient decision-making policy for intelligent vehicles in order for intelligent vehicles such as autonomous vehicle to perform maneuvers based on driving encounters.

Figure 12:
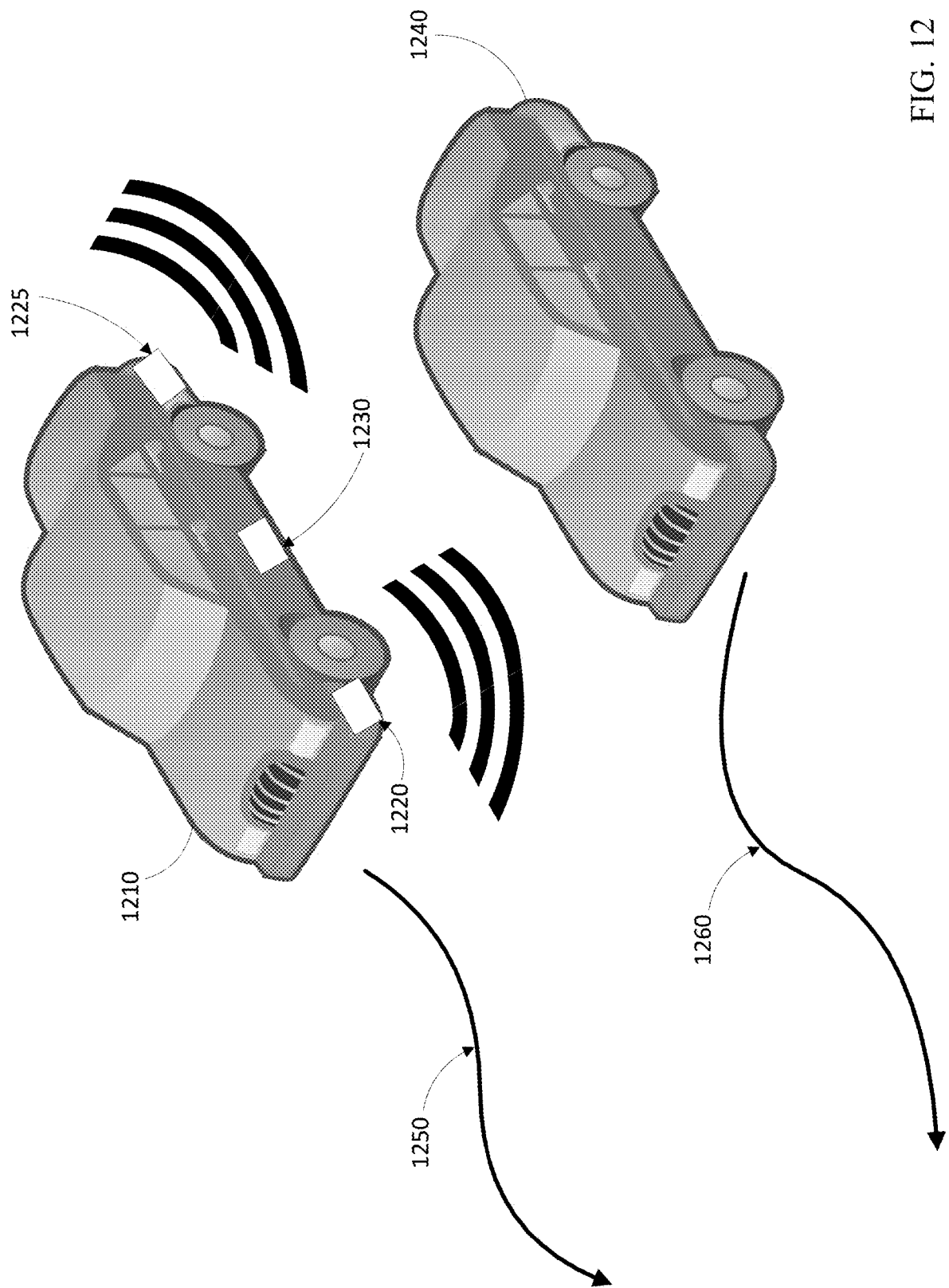
FIG. 12 shows an exemplary embodiment of a vehicle 1210 with one or more sensors.

FIG. 12 shows an exemplary embodiment of a vehicle 1210 with one or more sensors. The sensors can sense trajectory information associated with one or more vehicles. The one or more sensor may be able to sense a location of a second vehicle 1240. Each sensor may be a LiDAR sensor, a camera, or any other sensor suitable for sensing a location of a vehicle. The location of the second vehicle 1240 may be sensed relative to the first vehicle 1210. The one or more sensors may include a first sensor 1220, a second sensor 1225, and a third sensor 1230. The first sensor 1220 and the second sensor 1225 can be LiDAR sensors. The third sensor 1230 can be a camera. The first vehicle 1210 can have a GPS sensor (not shown). The first vehicle 1210 can use the GPS sensor to sense the trajectory 1250, which may also be referred to as the first trajectory information 1250, of the first vehicle 1210. The GPS sensor can also sense the absolute location of the first vehicle 1210. The first vehicle 1210 can sense the relative location of the second vehicle 1240 with respect to the first vehicle 1210 using on or more of the sensors 1220, 1225, 1230. The trajectory 1260, which may also be referred to as the second trajectory information 1260, of the second vehicle 1240 can then be calculated by comparing the relative location of the second vehicle 1240 to the absolute location of the first vehicle 1210 at a given time. In some embodiments, the second vehicle 1240 may have a GPS sensor that can measure the second trajectory information 1260.

Figure 13:
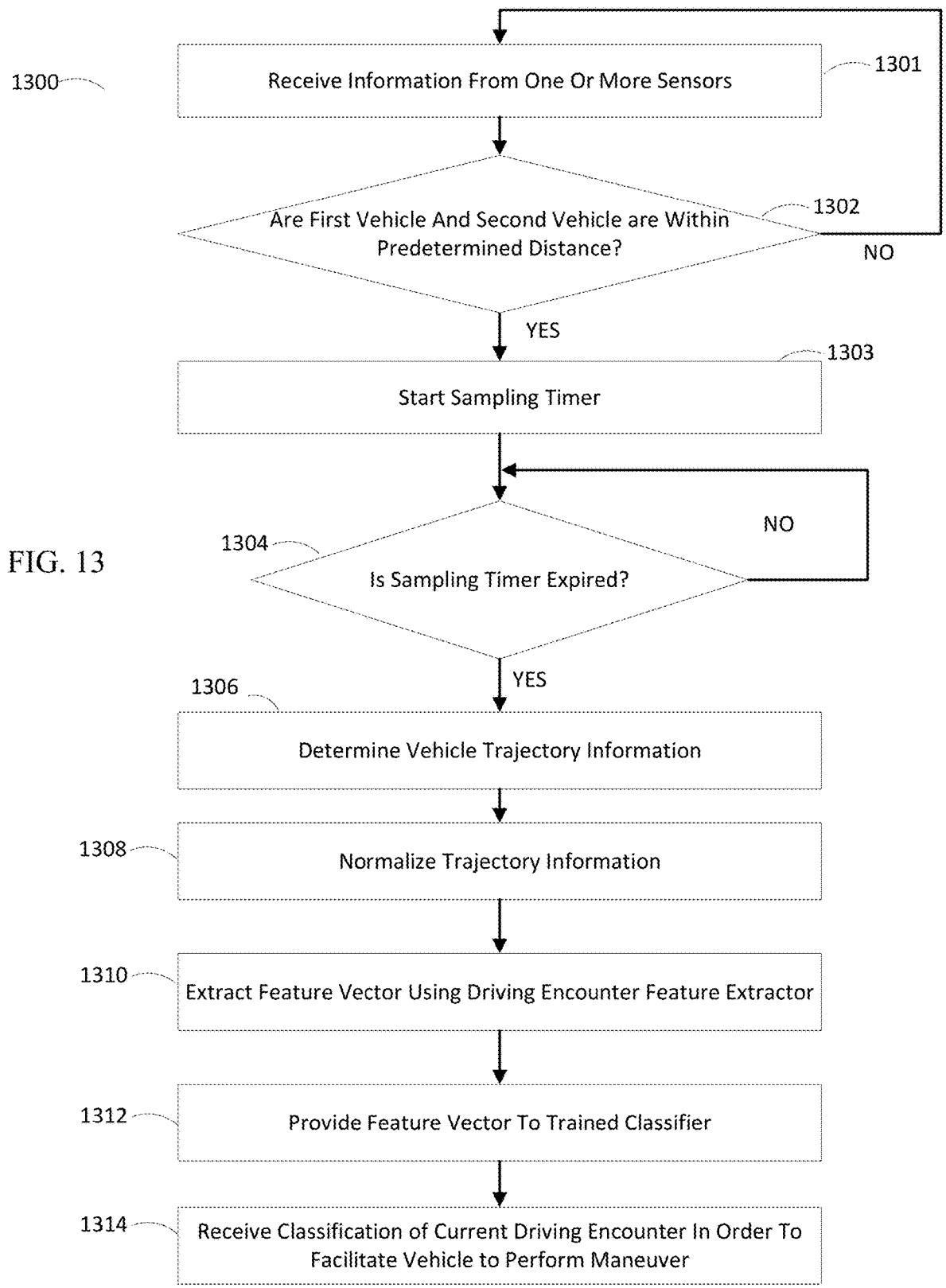
FIG. 13 shows an example of a process for facilitating a vehicle to perform a maneuver.

FIG. 13. shows an example 1300 of a process for facilitating a vehicle to perform a maneuver with some embodiments of the disclosed subject matter. As shown in FIG. 13, at 1301, the process 1300 can receive information from a one or more sensors couple to a first vehicle. The one or more sensors can include any suitable sensor as described above. The information can include parameters such as GPS coordinates, location of the second vehicle in relation to the first vehicle, time, a velocity of the first vehicle or other applicable parameters as described above. The process 1300 can then proceed to 1302.

At step 1302, the process 1300 can determine that the first vehicle is within a predetermined distance of the second vehicle. The predetermined distance can be a distance that implies a driving encounter is occurring, such as 100 meters as described above. The process 1300 can sense the vehicles are within the predetermined distance of each other using the information received from the one or more sensors coupled to the first vehicle. If the first vehicle and second vehicle are within the predetermined distance of each other ("YES" at step 1302), the process 1300 can proceed to step 1303. If the first vehicle and second vehicle are not within the predetermined distance of each other ("NO" at step 1302), the process 1300 can proceed to 1301, forming an iterative loop.

At 1303, process 1300 can start a sampling timer. The sampling timer may be set to count down from a predetermined sampling time. The sampling time can be a minimum threshold time that a trajectory length is meaningful, such as about 10 seconds as described above. The process 1300 may need to continue to receive information from the one or more sensors until sufficient information has been obtained determine vehicle trajectory information and to classify vehicle trajectory information, as will be discussed below. The process can then proceed to 1304.

At 1304, the process 1300 can determine if the sampling timer is expired. If the process 1300 determines that the sampling timer is not expired, the ("NO") at 1304, the process 1300 may proceed to 1304. If the process 1300 determines that the sampling timer is expired, the ("YES") at 1304, the process may proceed to 1306.

At 1306, process 1300 can determine, using the information received from the one or more sensors coupled to the first vehicle, the trajectory, also known as first trajectory information, of the first vehicle. The one or more sensors can include any suitable sensor as described above. The process 1300 can also determine the trajectory, also known as second trajectory information, of the second vehicle as described above. The process 1300 can then proceed to 1308.

At 1308, the process 1300 can normalize the first trajectory information and second trajectory information to a predetermined number of data points. The number of data points can be the length that a driving encounter feature extractor, which will be described below, uses. In some embodiments, the number of data points can be 100-200 samples. The process 1300 can use trajectory transformation, re-sampling methods, trajectory substitution, points of interest, scale-invariant features, or another other suitable technique for normalizing the first trajectory information and second trajectory information to a predetermined number of data points. The process 1300 can then proceed to 1310.

At 1310, the process 1300 can extract a feature vector using the driving encounter feature extractor. A current driving encounter, which can include the first trajectory information and the second trajectory information, can be input to the driving encounter feature extractor, which can then extract the feature vector. The driving encounter feature extractor can be deep-learning approach including a trained autoencoder such as the LSTMAE, DTW-ConvAE, NED-LSTMAE, or other suitable autoencoder trained using unsupervised learning. The autoencoder can be trained using a plurality of suitable driving encounters unified to the predetermined number of data points, as described above. The feature vector can be the middle layer h of the autoencoder as described above. The driving encounter feature extractor can also use a distanced based approach such as DTW or NED, where the current driving encounter is input and the feature vector is directly output. The process 1300 can then proceed to 1312.

At 1312, the process 1300 can provide the feature vector to a trained classifier. The trained classifier can take an input feature vector and output a classification of the feature vector. The classifier can be trained using unsupervised learning including clustering techniques such as k-means clustering, DBSCAN, OPTICS, or another suitable unsupervised learning method for grouping feature vectors. If clustering is used, the number of clusters may be selected by maximizing the between-cluster distance and minimizing the within-cluster distance using an optimization technique known in the art. If k-means clustering is used, the number of clusters can be about 10. If k-means clustering is used, the classification output can be the cluster that the input feature vector belongs to. The classifier can be trained by using a plurality of feature vectors extracted from a plurality of driving encounters. If the driving encounter feature extractor is an autoencoder, the classifier can be trained using a plurality of feature vectors extracted from the plurality driving encounters used to train the autoencoder. The process 1300 can then proceed to 1314.

At 1314, the process 1300 can receive the classification output at 1312 in order to facilitate the first vehicle to perform a maneuver based on the current driving encounter.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] N. Deo, A. Rangesh, and M. M. Trivedi, "How would surround vehicles move? A unified framework for maneuver classification and motion prediction," arXiv preprint arXiv:1801.06523, 2018.

[2] J. Taylor, X. Zhou, N. M. Rouphail, and R. J. Porter, "Method for investigating intradriver heterogeneity using vehicle trajectory data: A dynamic time warping approach," Transportation Research Part B: Methodological, vol. 73, pp. 59-80, 2015.

[3] P. C. Besse, B. Guillouet, J.-M. Loubes, and F. Royer, "Destination prediction by trajectory distribution-based model," IEEE Transactions on Intelligent Transportation Systems, 2017.

[4] C. Piciarelli, C. Micheloni, and G. L. Foresti, "Trajectory-based anomalous event detection," IEEE Transactions on Circuits and Systems for video Technology, vol. 18, no. 11, pp. 1544-1554, 2008.

[5] Z. Sun, P. Hao, X. J. Ban, and D. Yang, "Trajectory-based vehicle energy/emissions estimation for signalized arterials using mobile sensing data," Transportation Research Part D: Transport and Environment, vol. 34, pp. 27-40, 2015.

[6] Z.-J. Chen, C.-Z. Wu, Y.-S. Zhang, Z. Huang, J.-F. Jiang, N.-C. Lyu, and B. Ran, "Vehicle behavior learning via sparse reconstruction with '2 □ 'p minimization and trajectory similarity," IEEE Transactions on Intelligent Transportation Systems, vol. 18, no. 2, pp. 236-247, 2017.

[7] T. Appenzeller, "The scientists' apprentice," Science, vol. 357, no. 6346, pp. 16-17, 2017.

[8] G. Yuan, P. Sun, J. Zhao, D. Li, and C. Wang, "A review of moving object trajectory clustering algorithms," Artificial Intelligence Review, vol. 47, no. 1, pp. 123-144, 2017.

[9] Z. Feng and Y. Zhu, "A survey on trajectory data mining: Techniques and applications," IEEE Access, vol. 4, pp. 2056-2067, 2016.

[10] P. C. Besse, B. Guillouet, J.-M. Loubes, and F. Royer, "Review and perspective for distance-based clustering of vehicle trajectories," IEEE Transactions on Intelligent Transportation Systems, vol. 17, no. 11, pp. 3306-3317, 2016.

[11] D. Yao, C. Zhang, Z. Zhu, Q. Hu, Z. Wang, J. Huang, and J. Bi, "Learning deep representation for trajectory clustering," Expert Systems, DOI: 10.1111/exsy.12252.

[12] H. Zhao, C. Wang, Y. Lin, F. Guillemard, S. Geronimi, and F. Aioun, "On-road vehicle trajectory collection and scene-based lane change analysis: Part I," IEEE Transactions on Intelligent Transportation Systems, vol. 18, no. 1, pp. 192-205, 2017.

[13] W. Yao, Q. Zeng, Y. Lin, D. Xu, H. Zhao, F. Guillemard, S. Geronimi, and F. Aioun, "On-road vehicle trajectory collection and scene-based lane change analysis: Part II," IEEE Transactions on Intelligent Transportation Systems, vol. 18, no. 1, pp. 206-220, 2017.

[14] M. Y. Choong, L. Angeline, R. K. Y. Chin, K. B. Yeo, and K. T. K. Teo, "Modeling of vehicle trajectory clustering based on Icss for traffic pattern extraction," in Automatic Control and Intelligent Systems (I2CACIS), 2017 IEEE 2nd International Conference on. IEEE, 2017, pp. 74-79.

[15] P. Zhao, K. Qin, X. Ye, Y. Wang, and Y. Chen, "A trajectory clustering approach based on decision graph and data field for detecting hotspots," International Journal of Geographical Information Science, vol. 31, no. 6, pp. 1101-1127, 2017.

[16] J. Wang, C. Wang, X. Song, and V. Raghavan, "Automatic intersection and traffic rule detection by mining motor-vehicle gps trajectories," Computers, Environment and Urban Systems, vol. 64, pp. 19-29, 2017.

[17] X. Zhan, Y. Zheng, X. Yi, and S. V. Ukkusuri, "Citywide traffic volume estimation using trajectory data," IEEE Transactions on Knowledge and Data Engineering, vol. 29, no. 2, pp. 272-285, 2017.

[18] J. Kim and H. S. Mahmassani, "Spatial and temporal characterization of travel patterns in a traffic network using vehicle trajectories," Transportation Research Part C: Emerging Technologies, vol. 59, pp. 375-390, 2015.

[19] F. T. Pokorny, K. Goldberg, and D. Kragic, "Topological trajectory clustering with relative persistent homology," in Robotics and Automation (ICRA), 2016 IEEE International Conference on. IEEE, 2016, pp. 16-23.

[20] S. Li, W. Wang, Z. Mo, and D. Zhao, "Clustering of naturalistic driving encounters using unsupervised learning," arXiv preprint arXiv:1802.10214, 2018.

[21] E. Galceran, A. G. Cunningham, R. M. Eustice, and E. Olson, "Multipolicy decision-making for autonomous driving via changepoint-based behavior prediction: Theory and experiment," Autonomous Robots, vol. 41, no. 6, pp. 1367-1382, 2017.

[22] J. Bian, D. Tian, Y. Tang, and D. Tao, "A survey on trajectory clustering analysis," arXiv preprint arXiv:1802.06971, 2018.

[23] D. Yao, C. Zhang, Z. Zhu, J. Huang, and J. Bi, "Trajectory clustering via deep representation learning," in Neural Networks (IJCNN), 2017 International Joint Conference on. IEEE, 2017, pp. 3880-3887.

[24] B. M. Lake, R. Salakhutdinov, and J. B. Tenenbaum, "Human-level concept learning through probabilistic program induction," Science, vol. 350, no. 6266, pp. 1332-1338, 2015.

[25] M. C. Nechyba and Y. Xu, "Stochastic similarity for validating human control strategy models," IEEE Transactions on Robotics and Automation, vol. 14, no. 3, pp. 437-451, 1998.

[26] S. Hochreiter and J. Schmidhuber, "Long short-term memory," Neural computation, vol. 9, no. 8, pp. 1735-1780, 1997.

[27] M. Muller, "Dynamic time warping," Information retrieval for music and motion, pp. 69-84, 2007.

[28] A. A. Taha and A. Hanbury, "An efficient algorithm for calculating the exact hausdorff distance," IEEE transactions on pattern analysis and machine intelligence, vol. 37, no. 11, pp. 2153-2163, 2015.

[29] B. Aronov, S. Har-Peled, C. Knauer, Y. Wang, and C. Wenk, "Frechet distance for curves, revisited," in European Symposium on Algorithms. Springer, 2006, pp. 52-63.

[30] T. W. Liao, "Clustering of time series data: A survey," Pattern recognition, vol. 38, no. 11, pp. 1857-1874, 2005.

[31] R. Xu and D. Wunsch, "Survey of clustering algorithms," IEEE Transactions on neural networks, vol. 16, no. 3, pp. 645-678, 2005.

[32] T. Kanungo, D. M. Mount, N. S. Netanyahu, C. D. Piatko, R. Silverman, and A. Y. Wu, "An efficient k-means clustering algorithm: Analysis and implementation," IEEE transactions on pattern analysis and machine intelligence, vol. 24, no. 7, pp. 881-892, 2002.

[33] W. Wang, C. Liu, and D. Zhao, "How much data are enough? a statistical approach with case study on longitudinal driving behavior," IEEE Transactions on Intelligent Vehicles, vol. 2, no. 2, pp. 85-98, 2017.

The citation of any document is not to be construed as an admission that it is prior art with respect to the present invention.

What is claimed is:

1. A method in a data processing system comprising at least one processor and at least one memory, the at least one memory comprising instructions executed by the at least one processor to implement a driving encounter recognition system, the method comprising:
    receiving an information from a one or more sensors coupled to a first vehicle;
    determining, based on the information received from the one or more sensors coupled to the first vehicle, a first trajectory information associated with the first vehicle and a second trajectory information associated with a second vehicle;
    normalizing the first trajectory information and the second trajectory information to a predetermined number of data points;
    extracting, based on a current driving encounter comprising the first trajectory information and the second trajectory information, a feature vector;
    providing the feature vector to a trained classifier, wherein the classifier was trained using unsupervised learning based on a plurality of feature vectors corresponding to driving encounters; and
    receiving, from the trained classifier, a classification of the current driving encounter in order to facilitate the first vehicle to perform a maneuver based on the current driving encounter.

2. The method of claim 1, wherein the method further comprises determining that the first vehicle and the second vehicle are within a predetermined distance of each other in order to start receiving the information.

3. The method of claim 1, wherein the method further comprises receiving the information for a predetermined time.

4. The method of claim 3, wherein the predetermined time is 5 to 20 seconds.

5. The method of claim 1, wherein the classifier was trained using a clustering technique.

6. The method of claim 5, wherein the classifier was trained using k-means clustering.

7. The method of claim 5, wherein the clustering technique has a number of clusters selected in order maximize between-cluster distance and minimize within-cluster distance.

8. The method of claim 1, wherein the predetermined number of data points is 50 to 400 data points.

9. The method of claim 1, wherein the feature vector is extracted using an autoencoder, and the plurality of feature vectors were extracted using the autoencoder.

10. The method of claim 9, wherein the autoencoder is one of:
    a long-short term memory autoencoder, a normalized Euclidean distance long-short term memory autoencoder, or a dynamic time warping convolutional autoencoder.

11. The method of claim 1, wherein the feature vector is extracted using a distance-based formula, and the plurality of feature vectors were extracted using the distance-based formula.

12. The method of claim 11, wherein the distance-based formula uses dynamic time warping or normalized Euclidean distance.

13. A method for training an autonomous vehicle, comprising:
    obtaining trajectories of a plurality of vehicles;
    identifying each pair of vehicles from the plurality of vehicles with a between-vehicle-distance that is less than a threshold;
    normalizing the trajectories of each pair of vehicles to a predetermined number of data points;
    learning features of each normalized trajectory;
    clustering each trajectory based on the learned features; and
    training the autonomous vehicle based on the learned features.

14. The method of claim 13, wherein the clustering further comprises k-means clustering.

15. The method of claim 13, wherein the clustering further comprises clustering each trajectory into one of a plurality of clusters, the plurality of clusters comprising a number of clusters selected in order maximize between-cluster distance and minimize within-cluster distance.

16. The method of claim 13, wherein the learning further comprises learning the features of each normalized trajectory using an autoencoder selected from: a long-short term memory autoencoder, a normalized Euclidean distance long-short term memory autoencoder, or a dynamic time warping convolutional autoencoder.

17. The method of claim 16, wherein the learning further comprises extracting features from a hidden layer of the autoencoder.

18. The method of claim 13, wherein the learning further comprises unsupervised learning based on a plurality of feature vectors corresponding to driving encounters, the plurality of feature vectors being extracted by a driving encounter feature extractor.

19. The method of claim 13, wherein the threshold is 100 meters.

* * * * *

UNITED STATES PATENT AND TRADEMARK OFFICE
CERTIFICATE OF CORRECTION

PATENT NO. : 11,194,331 B2
APPLICATION NO. : 16/175076
DATED : December 7, 2021
INVENTOR(S) : Wenshuo Wang et al.

Page 1 of 1

It is certified that error appears in the above-identified patent and that said Letters Patent is hereby corrected as shown below:

In the Specification

Column 6, Eq. (2), Line 54, "$x_{i+1} = w_{i,i+1}{}^T x_i + b_i$" should be --$x_{i+1} = w_{i,i+1}^T x_i + b_i$--.

Column 12, Line 15, "$k \in \mathbb{N}^+$ pet" should be --$k \in \mathbb{N}^+$ should be set--.

Column 18, Line 26, "Pokomy" should be --Pokorny--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*